(12) United States Patent
Ma et al.

(10) Patent No.: US 12,071,078 B2
(45) Date of Patent: Aug. 27, 2024

(54) CAR MOBILE PHONE CONNECTION DEVICE

(71) Applicants: Yaowu Ma, Stevenson Ranch, CA (US); Fen Ruan, Stevenson Ranch, CA (US); Pinzhen Huang, Zhengzhou (CN)

(72) Inventors: Yaowu Ma, Stevenson Ranch, CA (US); Fen Ruan, Stevenson Ranch, CA (US); Jun Ma, Zhengzhou (CN); Pinzhen Huang, Zhengzhou (CN); Chiaki Summer Ma, Stevenson Ranch, CA (US); Qianjia Ma, Stevenson Ranch, CA (US); George Ma, Stevenson Ranch, CA (US)

( * ) Notice: Subject to any disclaimer, the term of this patent is extended or adjusted under 35 U.S.C. 154(b) by 106 days.

(21) Appl. No.: 17/817,649

(22) Filed: Aug. 4, 2022

(65) Prior Publication Data

US 2023/0051385 A1 Feb. 16, 2023

Related U.S. Application Data

(60) Provisional application No. 63/231,729, filed on Aug. 11, 2021.

(51) Int. Cl.
*B60R 11/02* (2006.01)
*G06F 13/38* (2006.01)
*B60R 11/00* (2006.01)

(52) U.S. Cl.
CPC ........ *B60R 11/0241* (2013.01); *G06F 13/385* (2013.01); *B60R 2011/0003* (2013.01); *B60R 2011/0075* (2013.01)

(58) Field of Classification Search
CPC ......... B60R 11/0241; B60R 2011/0003; B60R 2011/0075; B60R 2011/0054; B60R 2011/007; B60R 2011/0071; B60R 2011/0078; B60R 2011/0005; B60R 2011/0085; B60N 3/14; H01R 13/622; H01R 13/639; H01R 13/66; H01R 33/94; H01R 33/945; H01R 24/005; H01R 2201/26; H02J 7/0044; H02J 50/10; H04M 1/04; G06F 13/385
See application file for complete search history.

(56) References Cited

U.S. PATENT DOCUMENTS 11,772,573 B1 * 10/2023 Zheng .................... H04M 1/04
                                                                             379/446
2018/0341289 A1 * 11/2018 Schachter ............ H04B 1/3877

* cited by examiner

*Primary Examiner* — Tuan D Nguyen
(74) *Attorney, Agent, or Firm* — Syncoda LLC; Feng Ma

(57) ABSTRACT

A car mobile phone connection device includes: a USB connector socket or a car cigarette lighter socket, and a mobile phone holder including a paired USB connector plug or a car cigarette lighter plug and a mobile phone connection holding mechanism; wherein the socket has one or more of sunken external thread, raised external thread, sunken bayonet slot, raised bayonet slot, screw holes; the plug has flange and internal thread locking cap, flange and bayonet locking cap, flange and screw through-hole plate and screws, or screw through-hole flange and screws; the mobile phone connection holding mechanism has a mobile phone connector plug, a wireless charging board, or an NFC communication board. The socket is installed in the car. The mobile phone is set on the mobile phone connection holding mechanism, fixed on the car through the plug and the socket, and connected to a power supply of the car.

20 Claims, 9 Drawing Sheets

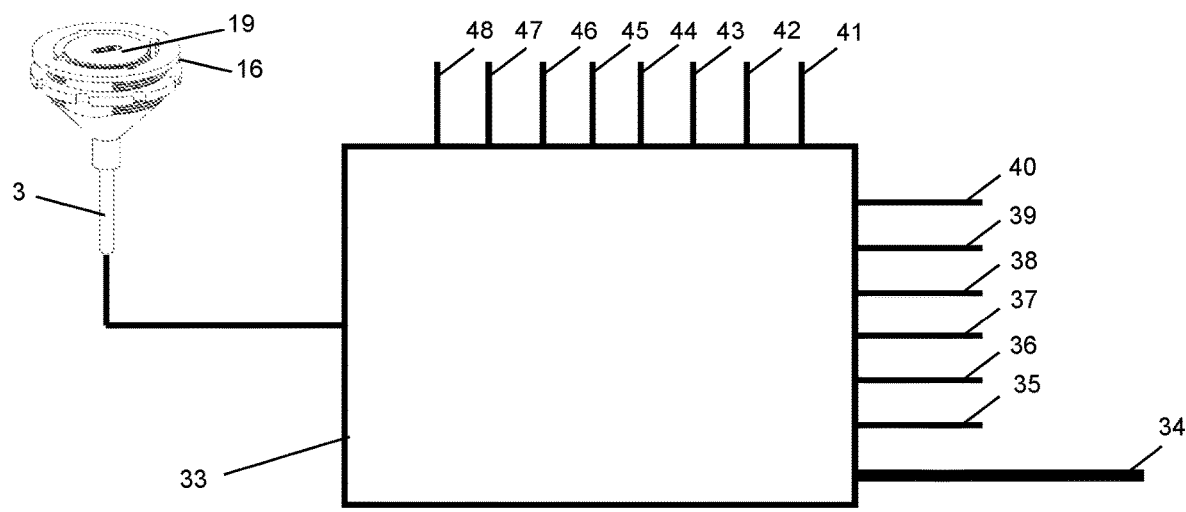
FIG. 17
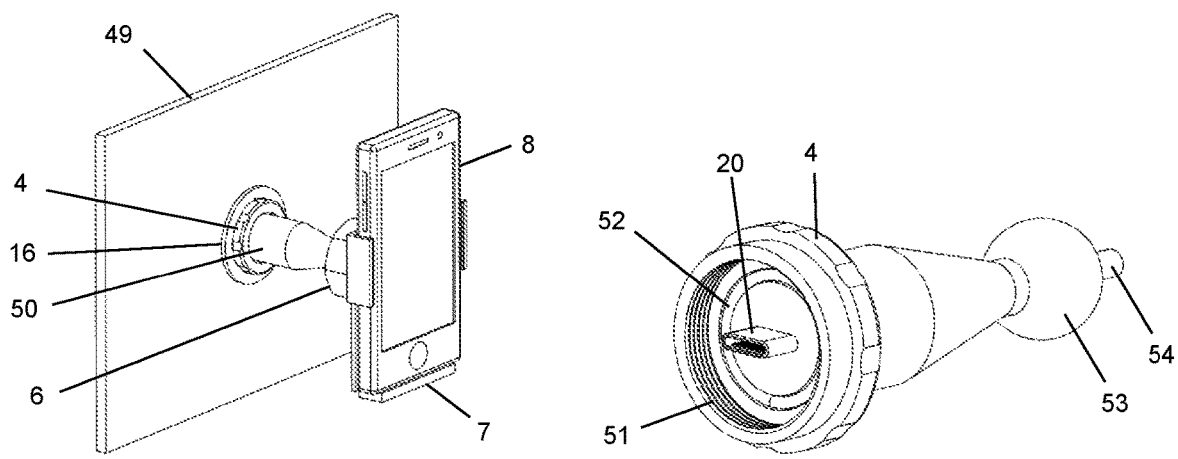
FIG. 18
FIG. 19
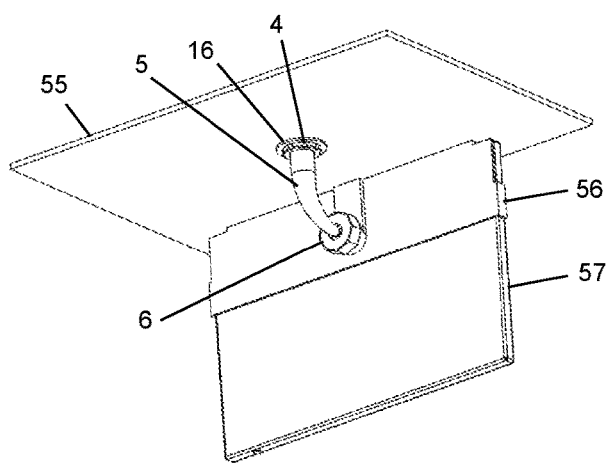
FIG. 20
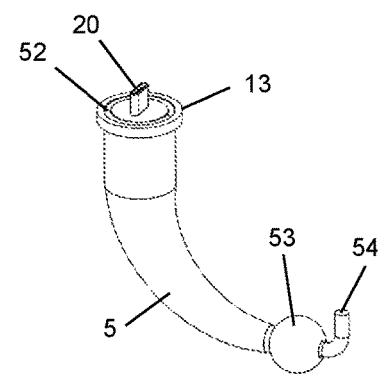
FIG. 21

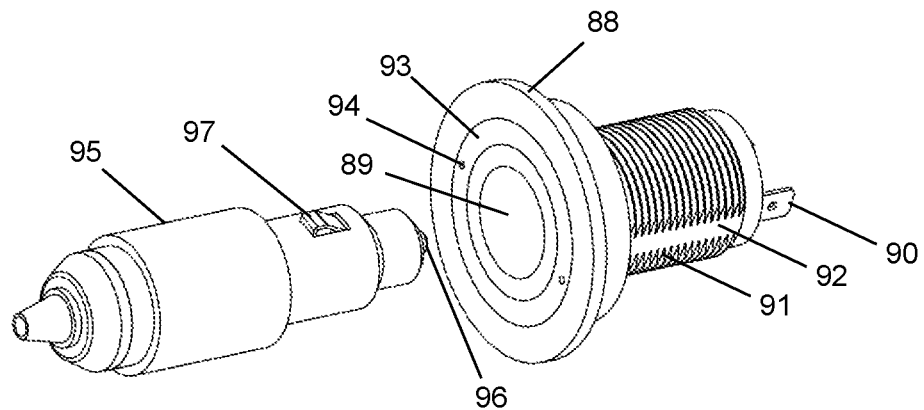
FIG. 41
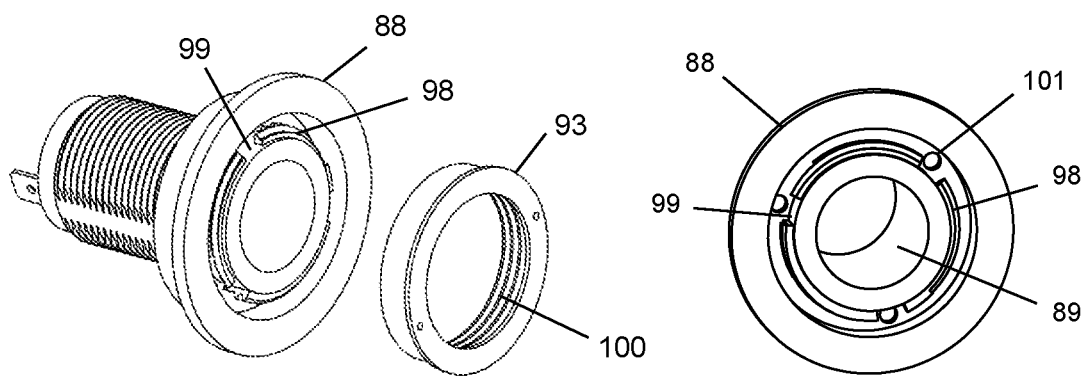
FIG. 42
FIG. 43
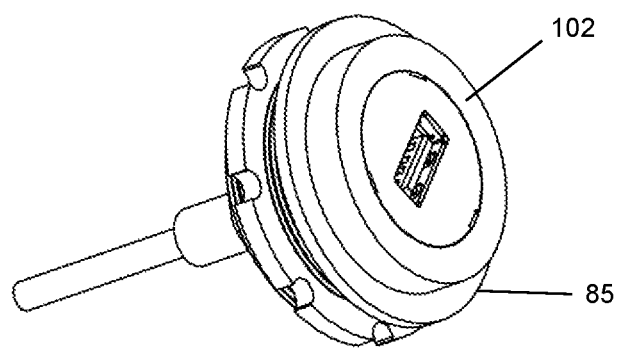
FIG. 44

CAR MOBILE PHONE CONNECTION DEVICE

CROSS-REFERENCE TO RELATED APPLICATIONS

This present disclosure claims benefit of and priority to U.S. Provisional Patent Application Ser. No. 63/231,729 filed on Aug. 11, 2021, the disclosure of which is hereby incorporated by reference in its entirety.

BACKGROUND

During car driving, the driver and passenger often need satellite navigation, listening to music, and sometimes they need to make phone calls, text messaging, internet access, video watching, etc. These activities are very convenient to implement through mobile phones. When using a mobile phone in a car, some special considerations are needed to avoid driving hazards and make the mobile phone work well and conveniently.

SUMMARY

In order to solve the deficiencies in the prior art, embodiments of the present disclosure provide a new type of car mobile phone connection device that supports the mobile phone, does not require a charging cable and becomes clean and unobstructed. The mobile phone can be easily operated with high performance directly by using mobile phone application software. The smart car infotainment system application software can also be used to meet the preferences of some people. Therefore, it is superior to existing car phone holders and smart car infotainment systems.

The present disclosure relates to a mobile phone connection device for cars, which is suitable for vehicles such as cars, trains, motorcycles, ships, airplanes, etc. and daily life.

The car mobile phone connection device of the present disclosure relates to a car, a USB connector socket installed on the car, a matching USB connector plug, a car cigarette lighter socket, a matching car cigarette lighter plug, a mobile phone connection holding mechanism, and a mobile phone. In some occasions, it also involves functional car infotainment systems, smart car infotainment systems, car speakers, car monitors, car antennas, car sensors, car controllers, etc.

The car mobile phone connection device of the present disclosure, comprises a USB connector socket or a mobile phone holder composed of a matching USB connector plug and a mobile phone connection holding mechanism; wherein, the USB connector socket, in addition to USB connector jack electrodes, also has sunken external thread, raised external thread, sunken bayonet slot, raised bayonet slot, screw holes, sunken external thread and bayonet slot, raised external thread and bayonet slot, sunken external thread and screw holes, raised external thread and screw holes, sunken external bayonet slot and screw holes, raised external bayonet slot and screw holes, sunken external thread and bayonet slot plus screw holes, or raised external threads and bayonet slots plus screw holes; the matching USB connector plug of the mobile phone holder, in addition to the matching USB connector plug electrodes, also has flange and internal thread locking cap, flange and bayonet locking cap, flange and screw through-hole plate and screws, or screw through-hole flange and screws; the mobile phone connection holding mechanism of the mobile phone holder has one or more of the mobile phone connector plug, wireless charging board, NFC communication board, which are connected to the mating USB connector plug through internal or external circuits; they have the following characteristics:

The USB connector socket is installed on the car, and the mobile phone is installed on the mobile phone connection holding mechanism; The mobile phone socket is sleeved on the mobile phone connector plug of the mobile phone connection holding mechanism for wired connection, in order to perform fixed voltage or current power supply, variable voltage or current power supply, or smart fast and slow charging according to the power supply protocol; Or the mobile phone is closed to one or more of the wireless charging board or the NFC communication board of the mobile phone connection holding mechanism for wireless power connection or wireless signal connection; For wireless power connection, the mobile phone is powered or intelligently fast and slow charged through wireless charging board by fixed or adjustable wireless transmission power according to corresponding wireless power supply protocol;

The above-mentioned external thread, or bayonet slot USB connector socket, or matching mobile phone holder further has the following characteristics:

(1) The above-mentioned mating USB connector plug with flange and internal thread locking cap, or flange and bayonet locking cap, inserts into the above external thread or bayonet slot USB connector socket, thereby:

The flange end face of the plug contacts the inlet end face of the socket;

Screw the internal thread of the locking cap of the plug into the external thread of the socket, or insert and screw the bayonet claw of the locking cap of the plug into the bayonet slot of the socket, so that the locking cap and the socket clamp the flange;

The plug and socket are electrically connected, and at the same time they are mechanically fixed by threads or bayonet;

The mobile phone connection holding mechanism is fixed with the matching USB connector plug, and also supports the mobile phone;

(2) The above-mentioned external thread or bayonet slot USB connector socket is inserted by a traditional mating USB connector plug without flange and internal thread locking cap, nor flange and bayonet locking cap, thereby:

The external thread or bayonet slot of the socket is not used for matching with the traditional plug;

The socket and the traditional plug are electrically connected without mechanical threads or bayonet locking;

(3) The above-mentioned mating USB connector plug with flange and internal thread locking cap, or flange and bayonet locking cap, inserts into a traditional USB connector socket without external threads nor bayonet slot, thereby:

The flange end face of the plug touches or does not touch the inlet end face of the traditional socket;

The internal thread locking cap or bayonet locking cap of the plug is not used for matching with the traditional socket;

The plug and the traditional socket are electrically connected without mechanical threads or bayonet locking;

Or,

The above-mentioned screw hole USB connector socket, or mobile phone holder further has the following characteristics:

(1) The above-mentioned mating USB connector plug with flange and screw through-hole plate and screws, or screw through-hole flange and screws inserts into the above-mentioned screw hole USB connector socket, thereby:

The end face of the flange or the screw through-hole flange of the plug contacts the inlet end face of the socket;

The screws of the plug go through the through-holes of the screw through-hole plate or the screw through-hole flange, and screw into the screw holes of the socket, so that the screw through-hole plate and the socket clamp the flange, or the screws and the socket clamp the screw through-hole flange;

The plug and socket are electrically connected, and at the same time they are mechanically fixed by screws;

The mobile phone connection holding mechanism is fixed with the matching USB connector plug, and also supports the mobile phone;

(2) The screw hole USB connector socket is inserted by the traditional mating USB connector plug without flange and screw through-hole plate and screws, nor screw through-hole flange and screws, thereby:

The screw holes of the socket are not used for matching with traditional plugs;

The socket and the traditional plug are electrically connected without mechanical screw locking;

(3) The above-mentioned mating USB connector plug with flanges and screw through-hole plate and screws, or screw through-hole flange and screws, inserts into the traditional USB connector socket without screw holes, thereby:

The end face of the flange or the screw through-hole flange of the plug contacts or does not contact the inlet end face of the socket;

The screws of the plug are not used for matching with the traditional socket;

The plug and the traditional socket are electrically connected without mechanical screw locking;

The above-mentioned USB connector sockets with external thread and bayonet slot, external thread and screw holes, external bayonet slot and screw holes, or external thread and external bayonet slot and screw holes, can accept the mating USB connector plug with flange and internal thread locking cap, flange and bayonet locking cap, flange and screw through-hole plate and screws, or screw through-hole flange and screws at different times. According to the above operation, the plug and the socket are electrically connected with mechanically fixing for same locking mating type or without mechanically fixing for different locking mating type.

In some implementations, the type of the USB connector is Type-A or Type-C, or is replaced with the HDMI connector; the sunken or raised socket has a perforated socket cover.

In some implementations, the mobile phone is set on the mobile phone holder, and is operated directly on the phone. The sound is produced by the phone speaker, or the image is shown on the phone display; Or the mobile phone gets the wired power or signal connection with other parts of the car infotainment system or with the car's connection converter through the mobile phone connector socket, or gets the wireless signal connection through Wi-Fi, Bluetooth or NFC wireless communication, so that there is one or more of the following characteristics:

(1) Use voice input, touch or key input on the mobile phone, to operate mobile application Apps, perform satellite navigation, play sound, play video, listen to the radio, watch TV, browse internet, make phone calls, or do text and video communications. The sound is produced by the car speakers, or the image is shown on the display of the car infotainment system;

(2) Use voice input, touch or key input on the car infotainment system, to operate mobile application Apps, perform satellite navigation, play sound, play video, listen to the radio, watch TV, browse internet, make phone calls, or do text and video communications. The sound is produced by the car speakers, or the image is shown on the display of the car infotainment system;

(3) Operate on the mobile phone or operate on the car infotainment system, to use the internal antenna of the mobile phone, or use the car's antenna for mobile phone communication, mobile data communication, Wi-Fi communication, Bluetooth communication, walkie-talkie phone communication, satellite navigation signal receiving, radio signal receiving, or TV signal receiving.

In some implementations, there is a rubber ring between the port of the USB connector socket and the flange or port of the matching USB connector plug, so that high-performance sealing or waterproof performance can be achieved by squeezing the rubber ring.

In some implementations, the USB connector socket of the car mobile phone connection device of the present disclosure are installed on one or more of the front panel of the car dashboard, the upper panel of the car dashboard, the back of the car seat, the front ceiling of the car, the middle ceiling of the car, the rear ceiling of the car, the inside of the car window, the outside of the car roof, the outside of the car head, the exterior of the rear of the car, the exterior of both sides of the car, or on motorcycles, trains, ships, airplanes, buildings, instruments and equipment.

In some implementations, the mobile phone holder of the present disclosure, is replaced with GPS satellite navigator, notebook computer, tablet computer, TV, display, camera, radar, lighting display board, searchlight, toy, lighting, fragrance, detector, electrical socket, electrical plug, socket extension converter, USB memory, USB audio player, USB video player, USB socket, USB interface extension converter, HDMI socket, electric heating cup, electric fan, wireless charger, wireless NFC communicator, coat hook, or its electrical connection device holder, so that it gets fixed mechanically or/and gets connected electrically with power or signal.

In another aspect, a vehicle is provided including one or more mobile phone connection devices. For example, a car is provided with a USB connector socket having a sunken external thread, raised external thread, sunken bayonet slot, raised bayonet slot, screw holes, sunken external thread and bayonet slot, raised external thread and bayonet slot, sunken external thread and screw holes, raised external thread and screw holes, sunken external bayonet slot and screw holes, raised external bayonet slot and screw holes, sunken external thread and bayonet slot plus screw holes, or raised external threads and bayonet slots plus screw holes; it has the following characteristics:

The above-mentioned USB connector socket is matched with a USB connector plug in a mobile phone holder composed of a USB connector plug and a mobile phone connection holding mechanism; wherein, the matching USB connector plug of the mobile phone holder, in addition to the matching USB connector plug electrodes, also has flange and internal thread locking cap, flange and bayonet locking cap, flange and screw through-hole plate and screws, or screw through-hole flange and screws; the mobile phone connection holding mechanism of the mobile phone holder has one or more of the mobile phone connector plug, wireless charging board, NFC communication board, which are connected to the mating USB connector plug through internal or external circuits; they have the following characteristics:

The USB connector socket is installed on the car, and the mobile phone is installed on the mobile phone connection holding mechanism; The mobile phone socket is sleeved on the mobile phone connector plug of the mobile phone connection holding mechanism for wired connection, in order to perform fixed voltage or current power supply, variable voltage or current power supply, or smart fast and slow charging according to the power supply protocol; Or the mobile phone is closed to one or more of the wireless charging board or the NFC communication board of the mobile phone connection holding mechanism for wireless power connection or wireless signal connection; For wireless power connection, the mobile phone is powered or intelligently fast and slow charged through wireless charging board by fixed or adjustable wireless transmission power according to corresponding wireless power supply protocol;

The above-mentioned external thread, or bayonet slot USB connector socket, or matching mobile phone holder further has the following characteristics:
  (1) The above-mentioned mating USB connector plug with flange and internal thread locking cap, or flange and bayonet locking cap, inserts into the above external thread or bayonet slot USB connector socket, thereby:
  The flange end face of the plug contacts the inlet end face of the socket;
  Screw the internal thread of the locking cap of the plug into the external thread of the socket, or insert and screw the bayonet claw of the locking cap of the plug into the bayonet slot of the socket, so that the locking cap and the socket clamp the flange;
  The plug and socket are electrically connected, and at the same time they are mechanically fixed by threads or bayonet;
  The mobile phone connection holding mechanism is fixed with the matching USB connector plug, and also supports the mobile phone;
  (2) The above-mentioned external thread or bayonet slot USB connector socket is inserted by a traditional mating USB connector plug without flange and internal thread locking cap, nor flange and bayonet locking cap, thereby:
  The external thread or bayonet slot of the socket is not used for matching with the traditional plug;
  The socket and the traditional plug are electrically connected without mechanical threads or bayonet locking;
  (3) The above-mentioned mating USB connector plug with flange and internal thread locking cap, or flange and bayonet locking cap, inserts into a traditional USB connector socket without external threads nor bayonet slot, thereby:
  The flange end face of the plug touches or does not touch the inlet end face of the traditional socket;
  The internal thread locking cap or bayonet locking cap of the plug is not used for matching with the traditional socket;
  The plug and the traditional socket are electrically connected without mechanical threads or bayonet locking; Or,
  The above-mentioned screw hole USB connector socket, or mobile phone holder further has the following characteristics:
  (1) The above-mentioned mating USB connector plug with flange and screw through-hole plate and screws, or screw through-hole flange and screws inserts into the above-mentioned screw hole USB connector socket, thereby:
  The end face of the flange or the screw through-hole flange of the plug contacts the inlet end face of the socket;
  The screws of the plug go through the through-holes of the screw through-hole plate or the screw through-hole flange, and screw into the screw holes of the socket, so that the screw through-hole plate and the socket clamp the flange, or the screws and the socket clamp the screw through-hole flange;
  The plug and socket are electrically connected, and at the same time they are mechanically fixed by screws;
  The mobile phone connection holding mechanism is fixed with the matching USB connector plug, and also supports the mobile phone;
  (2) The screw hole USB connector socket is inserted by the traditional mating USB connector plug without flange and screw through-hole plate and screws, nor screw through-hole flange and screws, thereby:
  The screw holes of the socket are not used for matching with traditional plugs;
  The socket and the traditional plug are electrically connected without mechanical screw locking;
  (3) The above-mentioned mating USB connector plug with flanges and screw through-hole plate and screws, or screw through-hole flange and screws, inserts into the traditional USB connector socket without screw holes, thereby:
  The end face of the flange or the screw through-hole flange of the plug contacts or does not contact the inlet end face of the socket;
  The screws of the plug are not used for matching with the traditional socket;
  The plug and the traditional socket are electrically connected without mechanical screw locking;
  The above-mentioned USB connector sockets with external thread and bayonet slot, external thread and screw holes, external bayonet slot and screw holes, or external thread and external bayonet slot and screw holes, can accept the mating USB connector plug with flange and internal thread locking cap, flange and bayonet locking cap, flange and screw through-hole plate and screws, or screw through-hole flange and screws at different times. According to the above operation, the plug and the socket are electrically connected with mechanically fixing for same locking mating type or without mechanically fixing for different locking mating type.

In some implementations, the type of the USB connector is Type-A or Type-C, or is replaced with the HDMI connector; the sunken or raised socket has a perforated socket cover.

In some implementations, the mobile phone is set on the mobile phone holder, and is operated directly on the phone. The sound is produced by the phone speaker, or the image is shown on the phone display; Or the mobile phone gets the wired power or signal connection with other parts of the car infotainment system or with the car's connection converter through the mobile phone connector socket, or gets the wireless signal connection through Wi-Fi, Bluetooth or NFC wireless communication, so that there is one or more of the following characteristics:
  (1) Use voice input, touch or key input on the mobile phone, to operate mobile application Apps, perform satellite navigation, play sound, play video, listen to the radio, watch TV, browse internet, make phone calls, or do text and video communications. The sound is produced by the car speakers, or the image is shown on the display of the car infotainment system;

(2) Use voice input, touch or key input on the car infotainment system, to operate mobile application Apps, perform satellite navigation, play sound, play video, listen to the radio, watch TV, browse internet, make phone calls, or do text and video communications. The sound is produced by the car speakers, or the image is shown on the display of the car infotainment system;

(3) Operate on the mobile phone or operate on the car infotainment system, to use the internal antenna of the mobile phone, or use the car's antenna for mobile phone communication, mobile data communication, Wi-Fi communication, Bluetooth communication, walkie-talkie phone communication, satellite navigation signal receiving, radio signal receiving, or TV signal receiving.

In some implementations, there is a rubber ring between the port of the USB connector socket and the flange or port of the matching USB connector plug, so that high-performance sealing or waterproof performance can be achieved by squeezing the rubber ring.

In some implementations, the USB connector socket of the car mobile phone connection device of the present disclosure are installed on one or more of the front panel of the car dashboard, the upper panel of the car dashboard, the back of the car seat, the front ceiling of the car, the middle ceiling of the car, the rear ceiling of the car, the inside of the car window, the outside of the car roof, the outside of the car head, the exterior of the rear of the car, the exterior of both sides of the car, or on motorcycles, trains, ships, airplanes, buildings, instruments and equipment.

In some implementations, the mobile phone holder of the present disclosure, is replaced with GPS satellite navigator, notebook computer, tablet computer, TV, display, camera, radar, lighting display board, searchlight, toy, lighting, fragrance, detector, electrical socket, electrical plug, socket extension converter, USB memory, USB audio player, USB video player, USB socket, USB interface extension converter, HDMI socket, electric heating cup, electric fan, wireless charger, wireless NFC communicator, coat hook, or its electrical connection device holder, so that it gets fixed mechanically or/and gets connected electrically with power or signal.

The car mobile phone connection device of the present disclosure, comprises a car cigarette lighter socket, or a mobile phone holder composed of a matching car cigarette lighter plug and a mobile phone connection holding mechanism, or a car containing a car cigarette lighter socket; wherein, the car cigarette lighter socket, in addition to car cigarette lighter jack electrodes, also has sunken external thread, sunken bayonet slot, raised bayonet slot, screw holes, sunken external thread and bayonet slot, raised external thread and bayonet slot, sunken external thread and screw holes, raised external thread and screw holes, sunken external bayonet slot and screw holes, raised external bayonet slot and screw holes, sunken external thread and bayonet slot plus screw holes, or raised external threads and bayonet slots plus screw holes; the matching car cigarette lighter plug of the mobile phone holder, in addition to the matching car cigarette lighter plug electrodes, also has flange and internal thread locking cap, flange and bayonet locking cap, flange and screw through-hole plate and screws, or screw through-hole flange and screws; the mobile phone connection holding mechanism of the mobile phone holder has one or more of the mobile phone connector plug, wireless charging board, NFC communication board, which are connected to the mating car cigarette lighter plug through internal or external circuits; they have the following characteristics:

The car cigarette lighter connector socket is installed on the car, and the mobile phone is installed on the mobile phone connection holding mechanism; The mobile phone socket is sleeved on the mobile phone connector plug of the mobile phone connection holding mechanism for wired connection, in order to perform fixed voltage or current power supply, variable voltage or current power supply, or smart fast and slow charging according to the power supply protocol; Or the mobile phone is closed to the wireless charging board of the mobile phone connection holding mechanism for wireless power connection; The mobile phone is powered or intelligently fast and slow charged by fixed or adjustable wireless transmission power according to corresponding wireless power supply protocol;

The above-mentioned external thread, or bayonet slot car cigarette lighter socket, or matching mobile phone holder further has the following characteristics:

(1) The above-mentioned mating car cigarette lighter plug with flange and internal thread locking cap, or flange and bayonet locking cap, inserts into the above external thread or bayonet slot car cigarette lighter socket, thereby:

The flange end face of the plug contacts the inlet end face of the socket;

Screw the internal thread of the locking cap of the plug into the external thread of the socket, or insert and screw the bayonet claw of the locking cap of the plug into the bayonet slot of the socket, so that the locking cap and the socket clamp the flange;

The plug and socket are electrically connected, and at the same time they are mechanically fixed by threads or bayonet;

The mobile phone connection holding mechanism is fixed with the matching car cigarette lighter plug, and also supports the mobile phone;

(2) The above-mentioned external thread or bayonet slot car cigarette lighter socket is inserted by a traditional mating car cigarette lighter plug without flange and internal thread locking cap, nor flange and bayonet locking cap, thereby:

The external thread or bayonet slot of the socket is not used for matching with the traditional plug;

The socket and the traditional plug are electrically connected without mechanical threads or bayonet locking;

(3) The above-mentioned mating car cigarette lighter plug with flange and internal thread locking cap, or flange and bayonet locking cap, inserts into a traditional car cigarette lighter socket without external threads nor bayonet slot, thereby:

The flange end face of the plug touches or does not touch the inlet end face of the traditional socket;

The internal thread locking cap or bayonet locking cap of the plug is not used for matching with the traditional socket;

The plug and the traditional socket are electrically connected without mechanical threads or bayonet locking;

Or,

The above-mentioned screw hole car cigarette lighter socket, or mobile phone holder further has the following characteristics:

(1) The above-mentioned mating car cigarette lighter plug with flange and screw through-hole plate and screws, or screw through-hole flange and screws inserts into the above-mentioned screw hole car cigarette lighter socket, thereby:

The end face of the flange or the screw through-hole flange of the plug contacts the inlet end face of the socket;

The screws of the plug go through the through-holes of the screw through-hole plate or the screw through-hole flange, and screw into the screw holes of the socket, so that the screw through-hole plate and the socket clamp the flange, or the screws and the socket clamp the screw through-hole flange;

The plug and socket are electrically connected, and at the same time they are mechanically fixed by screws;

The mobile phone connection holding mechanism is fixed with the matching car cigarette lighter plug, and also supports the mobile phone;

(2) The screw hole car cigarette lighter socket is inserted by the traditional mating car cigarette lighter plug without flange and screw through-hole plate and screws, nor screw through-hole flange and screws, thereby:

The screw holes of the socket are not used for matching with traditional plugs;

The socket and the traditional plug are electrically connected without mechanical screw locking;

(3) The above-mentioned mating car cigarette lighter plug with flanges and screw through-hole plate and screws, or screw through-hole flange and screws, inserts into the traditional car cigarette lighter socket without screw holes, thereby:

The end face of the flange or the screw through-hole flange of the plug contacts or does not contact the inlet end face of the socket;

The screws of the plug are not used for matching with the traditional socket;

The plug and the traditional socket are electrically connected without mechanical screw locking;

The above-mentioned car cigarette lighter sockets with external thread and bayonet slot, external thread and screw holes, external bayonet slot and screw holes, or external thread and external bayonet slot and screw holes, can accept the mating car cigarette lighter plug with flange and internal thread locking cap, flange and bayonet locking cap, flange and screw through-hole plate and screws, or screw through-hole flange and screws at different times. According to the above operation, the plug and the socket are electrically connected with mechanically fixing for same locking mating type or without mechanically fixing for different locking mating type.

In some implementations, the sunken or raised socket has a perforated socket cover.

In some implementations, the mobile phone is set on the car cigarette lighter plug mobile phone holder, and is operated directly on the phone. The sound is produced by the phone speaker, or the image is shown on the phone display; Or the mobile phone gets the wired power or signal connection with other parts of the car infotainment system or with the car's connection converter through the mobile phone connector socket, or gets the wireless signal connection through Wi-Fi or Bluetooth wireless communication, so that there is one or more of the following characteristics:

(1) Use voice input, touch or key input on the mobile phone, to operate mobile application Apps, perform satellite navigation, play sound, play video, listen to the radio, watch TV, browse internet, make phone calls, or do text and video communications. The sound is produced by the car speakers, or the image is shown on the display of the car infotainment system;

(2) Use voice input, touch or key input on the car infotainment system, to operate mobile application Apps, perform satellite navigation, play sound, play video, listen to the radio, watch TV, browse internet, make phone calls, or do text and video communications. The sound is produced by the car speakers, or the image is shown on the display of the car infotainment system;

(3) Operate on the mobile phone or operate on the car infotainment system, to use the internal antenna of the mobile phone, or use the car's antenna for mobile phone communication, mobile data communication, Wi-Fi communication, Bluetooth communication, walkie-talkie phone communication, satellite navigation signal receiving, radio signal receiving, or TV signal receiving.

In some implementations, there is a rubber ring between the port of the car cigarette lighter socket and the flange or port of the matching car cigarette lighter plug, so that high-performance sealing or waterproof performance can be achieved by squeezing the rubber ring.

In some implementations, the car cigarette lighter socket are installed on one or more of the front panel of the car dashboard, the upper panel of the car dashboard, the back of the car seat, the front ceiling of the car, the middle ceiling of the car, the rear ceiling of the car, the inside of the car window, the outside of the car roof, the outside of the car head, the exterior of the rear of the car, the exterior of both sides of the car, or on motorcycles, trains, ships, airplanes, buildings, instruments and equipment.

In some implementations, the mobile phone holder, is replaced with GPS satellite navigator, notebook computer, tablet computer, TV, monitor, camera, radar, lighting display board, searchlight, toy, lighting lamp, fragrance, detector, electrical socket, electrical plug, socket extension converter, Car cigarette lighter socket expansion converter, USB socket, USB interface expansion converter, HDMI socket, electric heating cup, electric fan, wireless charger, coat hook, or its electrical connection device holder, so that it gets fixed mechanically or/and gets connected electrically with power.

BRIEF DESCRIPTION OF THE DRAWINGS

FIG. 17 is a schematic diagram of the electrical connection between the USB-C connector socket and the car.

FIG. 18 is a scene where the USB-C connector socket 16 is used to connect and fix the mobile phone 8 on the vertical surface of the car dashboard.

FIG. 19 is the USB-C connector plug of FIG. 18.

FIG. 20 is a scene where the USB-C connector socket 16 is used to connect and fix a large-screen tablet computer 57 on the ceiling of a car.

FIG. 21 is the USB-C connector plug of FIG. 20.

FIG. 41 is a scene of a car cigarette lighter socket 88 of the present disclosure that is matched with a traditional car cigarette lighter plug 95.

FIG. 42 is a scene where the perforated socket cover 93 of FIG. 41 is separated from the car cigarette lighter socket 88.

FIG. 43 is the front of the car cigarette lighter socket 88, which has a sunken external thread 98, three sunken bayonet slots 99 and three screw holes 101.

FIG. 44 shows the perforated socket cover 102, which is installed on the raised USB-A connector socket 85 of FIG. 39.

DETAILED DESCRIPTION

Figure 1:
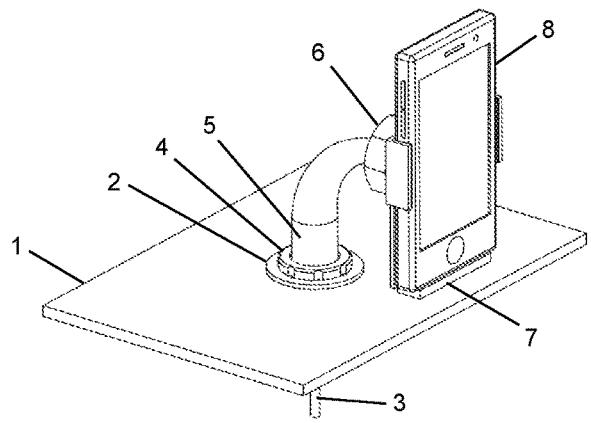
FIG. 1 is a car mobile phone connection device of the present disclosure, using the external thread of the USB connector socket 2 to fix the USB plug mobile phone holder to achieve electrical connection, an assembly drawing.

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the present disclosure. Instead, they are merely examples of apparatuses and methods consistent with aspects related to the disclosure as recited in the appended claims.

In order to use mobile phone safely and conveniently, Apple has made the product CarPlay, Google has made the product Android Auto, and Baidu has made the product CarLife, that is, smart car infotainment systems to facilitate the watching and operation of the large screen that is fixed firmly at a good position in the car. However, although the existing smart car infotainment system has a large screen, the operation interface is different from that of a mobile phone. The operation for navigation, music and video, phone call, internet browning, various apps and so on with the smart car infotainment system by driver and passenger, are usually nowhere near as familiar as that directly with phone. The car operating system application software is generally not as easy to use as the mobile phone application software, and its performance is worse than that of the mobile phone. Therefore, the smart car infotainment system cannot eliminate the original and simple car mobile phone holder. So far, people have made various car phone holders to support the phone to facilitate the one-handed operation of the driver. The existing car mobile phone holders are mounted on the window glass, air outlet, CD slot, cup holder, or car cigarette lighter socket. The mobile phone holder is not firmly mounted and easy to fall off; when powering the mobile phone, it also needs to use an obstructive charging cable. The problems of phone falling off and cable obstructing always disturb humans. And humans always do efforts from various aspect and have gotten a lot of progress. However, the solutions are still not enough.

In U.S. Ser. No. 10/797,436B2, U.S. Ser. No. 11/056,828B2 and Japanese patent JP6883871B2, the disclosures of which are hereby incorporated by reference in their entirety, the inventor used the car cigarette lighter socket to support the mobile phone holder and the mobile phone, and the mobile phone is electrically connected at the same time. It has better convenience and performance than before. Here, the present application adopts a USB connector socket, and also adopts a different structure to support the mobile phone holder and the mobile phone, and the mobile phone is electrically connected at the same time. In this way, the mobile phone can be connected to the car with high performance, which also improves the convenience and versatility. However, the USB connector is relatively small, especially the new version USB-C connector, which is small in size and small in mechanical strength, making it difficult to support mobile phone holders and mobile phones. If the USB connector socket plug is directly used to support the mobile phone or mobile phone holder, the vibration of the car or the inertial force during acceleration and deceleration will easily break the USB connector socket plug, short-circuit the wire, and cause damage to the car device or mobile phone, or cause a car fire. Therefore, the USB connector socket plug is not suitable for directly supporting a mobile phone or a mobile phone holder. In addition, this application also improves the structure of using the car cigarette lighter socket to support the mobile phone holder and the mobile phone, so that it is more versatile and flexible, more beautiful and not in the way.

Figure 2:
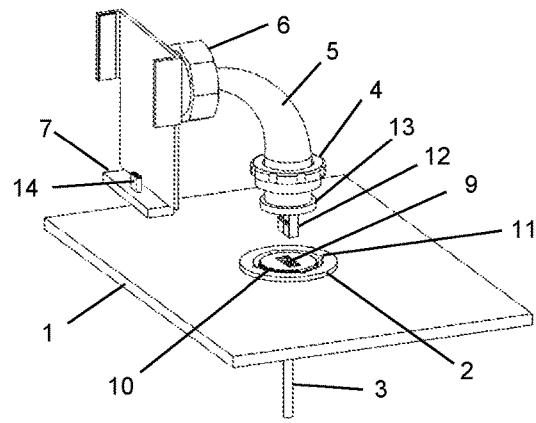
FIG. 2 is an exploded view of FIG. 1.
Figure 12:
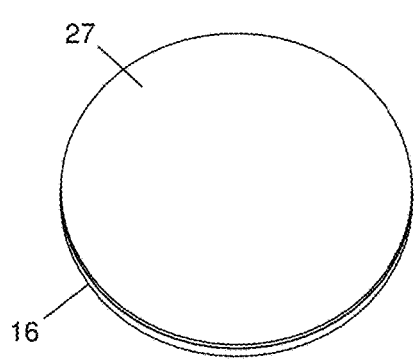
FIG. 12 uses the socket cover 27 of the present disclosure to cover the USB-C jack 19, the external thread 10 and the screw hole 11 of the socket of FIG. 7.

FIG. 1 is a car mobile phone connection device of the present disclosure, a scene where the mobile phone is fixed on the dashboard of the car, and the external thread of the USB connector socket 2 is used to fix the USB plug mobile phone holder and realize electrical connection. FIG. 2 is an exploded view of FIG. 1 with the mobile phone removed and the USB plug mobile phone holder separated from the car dashboard. Here, 1 is the upper panel of the dashboard of the car. 2 is the USB connector socket installed on the upper surface of the dashboard, where the type of USB is USB-A. 3 is the wire of the USB connector socket in the lower part of the dashboard. 4 is the threaded locking cap of the USB connector plug. 5 is the pole, which can be straight, curved, or telescopic and steerable. 6 is the ball hinge locking nut of the mobile phone holder. 7 is the mobile phone connection holding mechanism of the mobile phone holder, which has gripping claws, magnets or screws to fix the mobile phone, and can also have a mobile phone connector plug, wireless charging device, and NFC communication device for power connection or communication connection with the mobile phone. 8 is a mobile phone. 9 is the jack electrode of the USB connector socket. 10 is the sunken external thread of the jack port. The external thread is a single thread or a multi-thread thread. 11 is the screw holes, there are 4 in the FIG. 12 is the USB connector plug electrode. 13 is the flange of the USB connector plug. 14 is a cell phone connector plug electrode, which is electrically connected to the USB connector plug electrode 12 through a wire or a processing circuit. The mobile phone connection holding mechanism 7 and the USB connector plug form a component, which becomes a USB plug mobile phone holder.

When the mobile phone is fixed on the dashboard of the car, the USB connector plug electrode 12 is inserted into the jack electrode 9 of the USB connector socket, and the lower surface of the flange 13 contacts the upper surface of the socket, that is, the entrance end face of the socket. When the internal thread of the threaded locking cap 4 is screwed on the sunken external thread 10, the threaded locking cap 4 and the inlet end surface of the socket squeeze the flange 13 from the upper and lower sides to fix them together. Due to the matching of the USB connectors, the jack electrode 9 and the plug electrode 12 are electrically connected. Because the mobile phone connection holding mechanism 7 and the USB connector plug are a component, the internal wiring or circuit of the component electrically connects the plug electrode 12 to the mobile phone connector plug electrode 14. Here the mobile phone connector plug electrode 14 is USB-C Type, the phone is an Android phone. The mobile phone on the mobile phone connection holding mechanism moves from top to bottom, and the connector jack electrode of the mobile phone is sleeved on the plug electrode 14, so that the mobile phone is electrically connected, and the mobile phone is also fixed on the mobile phone connection holding mechanism. The mobile phone connector plug electrode 14, currently mainly are the USB-C connector of Google's Android system and the Lightning connector of Apple's iOS system. These two kinds of connectors have not only the power supply connection, but also the powerful signal connection. The previous old type connectors include Micro USB, Mini USB and so on. The latest generation of USB version is USB4, and the transmission speed can reach 40 Gbit/s.

Figure 3:
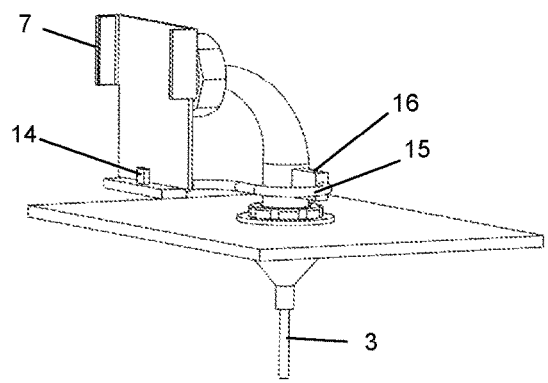
FIG. 3 changes the internal wiring or circuit of the component of FIG. 1 to an external wiring 15.

FIG. 3 changes the internal wiring or circuit of the component of FIG. 1 to external wiring. In FIG. 3, a USB connector jack is added at the pole 5, the USB connector plug 16 of the cable 15 is inserted into the jack, and the other end of the cable 15 is connected to the cell phone connector plug electrode 14 so as to connect the cell phone. The external wiring is easy to replace. At this time, internal wiring or circuit of the component is not required.

Figure 4:
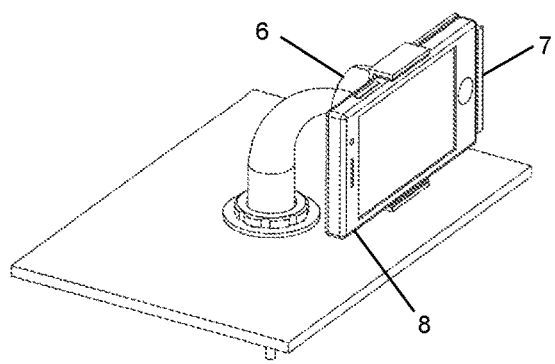
FIG. 4 rotates the long direction of the mobile phone 8 to horizontal.

FIG. 4 rotates the long direction of the mobile phone to horizontal. Loosen the ball hinge locking nut 6 of the mobile phone holder, rotate the mobile phone to a horizontal position in the long direction, and then tighten the locking nut 6.

Figure 5:
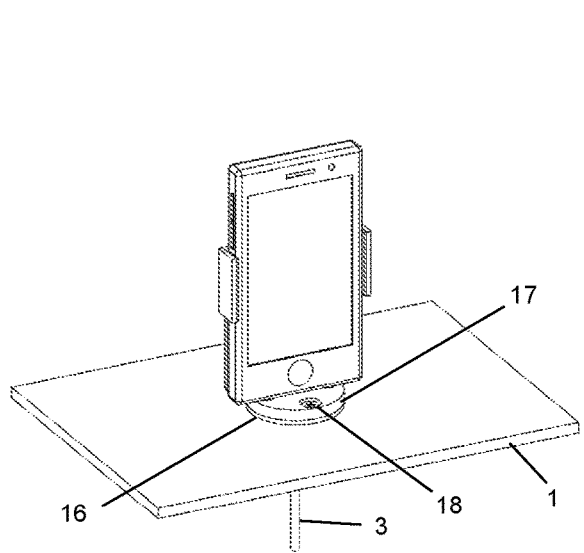
FIG. 5 is a car mobile phone connection device of the present disclosure, using the screw holes of the USB-C connector socket 16 to fix the USB-C plug mobile phone holder and to achieve electrical connection, an assembly drawing.
Figure 6:
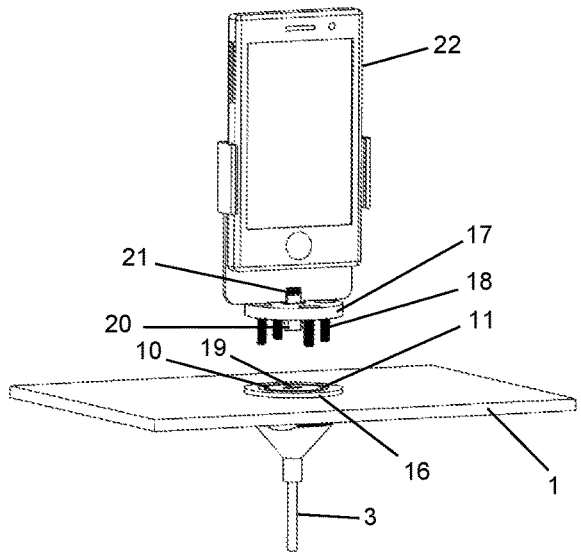
FIG. 6 is an exploded view of FIG. 5.

FIG. 5 is a car mobile phone connection device of the present disclosure, using the screw holes of the USB-C connector socket 16 to fix the USB-C plug mobile phone holder and achieve electrical connection. It is an assembly drawing. FIG. 6 is an exploded view of FIG. 5. 16 is the USB-C connector socket. 17 is a mobile phone connection holding mechanism of the mobile phone holder, which has a screw through-hole flange. 18 is the fixing screw. The end surface of the USB-C connector socket 16 has 4 screw holes 11 in addition to the sunken external thread 10. The type of socket here is USB-C. 19 is the USB-C jack. 20 is the USB-C plug electrode. The USB-C plug electrode 20 on the mobile phone holder is inserted into the jack 19 to realize electrical connection. Four screws 18 are used to pass through the screw through-holes of the flange of the mobile phone connection holding mechanism to fix the mobile phone holder on the USB-C connector socket 16. Here, the cell phone connector plug electrode 21 is a Lightning type, and the cell phone is an Apple cell phone 22. The cell phone connector plug electrode 21 is electrically connected to the USB-C connector plug electrode 20 through a direct wire connection or processing circuit. The threaded locking cap is convenient for hand-tightening and installation, which is suitable for occasions that often need to be disassembled and assembled. The screw method requires a screwdriver to tighten, and the installation is firmer, which is suitable for occasions that require disassembly and assembly less often.

Figure 7:
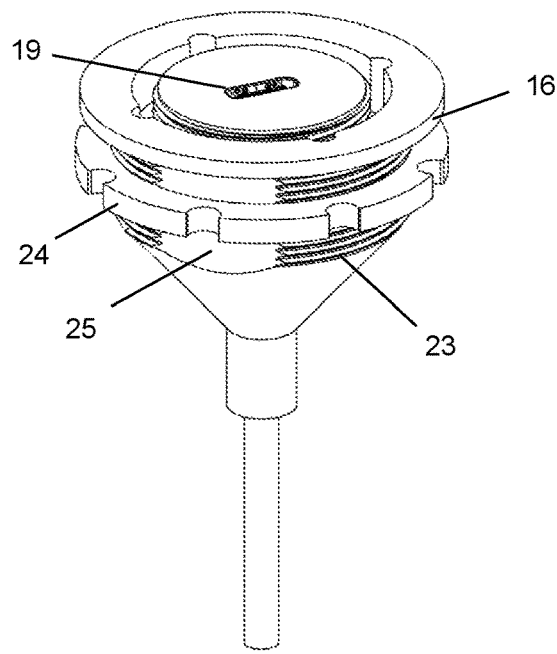
FIG. 7 is a USB-C socket of a car mobile phone connection device of the present disclosure.

FIG. 7 is a USB-C socket 16 of a car mobile phone connection device of the present disclosure. The lower part of the upper edge of the socket is provided with an external thread 23, and the matching thread ring 24 is rotated to squeeze the dashboard to fix the socket 16. A part of the cylindrical body of the external thread 21 is cut into a plane 25, and the hole of the dashboard panel also has a straight edge, which match each other to limit the rotation positioning direction of the socket 16.

Figure 8:
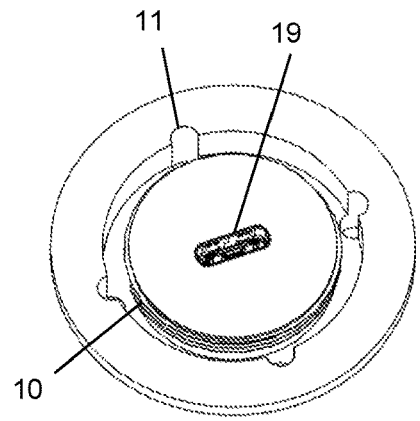
FIG. 8 is an end surface of the USB-C socket of FIG. 7.

FIG. 8 is an end surface of the USB-C socket of FIG. 7. The end face has a USB-C jack 19, a sunken external thread 10 and 4 screw holes 11. In the detailed design, the diameter of the external thread 10 can be changed. The 4 screw holes 11 can be reduced to two or three, and the position can also be changed.

Figure 9:
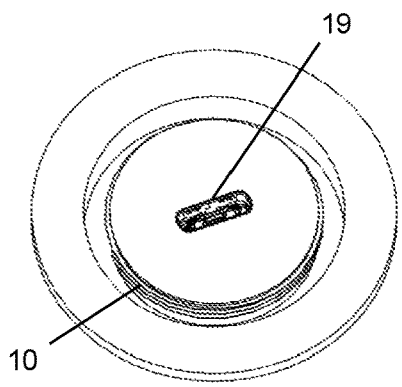
FIG. 9 shows that the USB-C socket of FIG. 7 retains the sunken external thread 10, and the screw hole 11 is omitted.

FIG. 9 shows that the USB-C socket of FIG. 7 retains the sunken external thread 10, and the screw hole 11 is omitted. At this time, the USB-C connector plug with flange and internal thread locking cap can be inserted into the socket to be connected electrically, and at the same time, the internal thread locking cap 4 can be matched with the external thread 10 to mechanically fix the plug. The USB-C connector plug only with the screw through-hole and screws can also be inserted into the socket to be connected electrically, but the screw 18 does not match the external thread 10, so the plug cannot be fixed mechanically.

Figure 10:
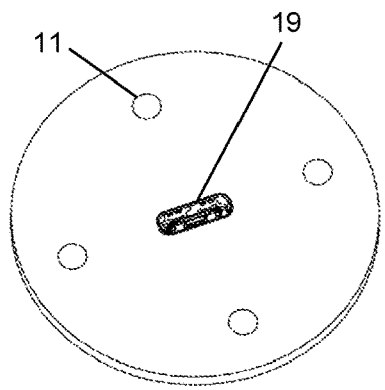
FIG. 10 shows that the USB-C socket of FIG. 7 retains the screw hole 11, and the sunken external thread 10 is omitted.

FIG. 10 shows that the USB-C socket of FIG. 7 retains the screw hole 11, and the sunken external thread 10 is omitted. At this time, the USB-C connector plug with the screw through-hole flange and screws can be inserted into the socket to be connected electrically, and at the same time, the screws 18 can be matched with the screw holes 11 to mechanically fix the plug. The USB-C connector plug only with the flange and internal thread locking cap can also be inserted into the socket to be connected electrically, but the internal thread locking cap 4 does not match the screw hole 11, so the plug cannot be fixed mechanically.

Figure 11:
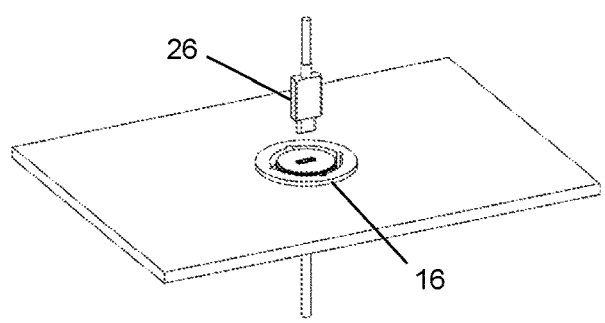
FIG. 11 is a scene in which a conventional USB-C connector plug without
flange and internal thread locking cap, nor screw through-hole and screws inserts into the USB-C socket of FIG. 7.

FIG. 11 is a scene in which a conventional USB-C connector plug 26 with neither flanges and internal thread locking caps, nor screw through-holes and screws is inserted into the USB-C socket of FIG. 7, which can be inserted and electrically connected, but cannot be mechanically fixed.

FIG. 12 is when the USB-C socket of FIG. 7 is not in use, the socket cover 27 of the present disclosure is used to cover the USB-C socket 19, the external thread 10 and the screw hole 11, so as to be beautiful, dustproof and waterproof. The socket cover 27 may have an internal thread and be screwed on the external thread 10, or it may be a tight fit, which is tightly fitted with the sinking groove of the external thread 10.

Figure 13:
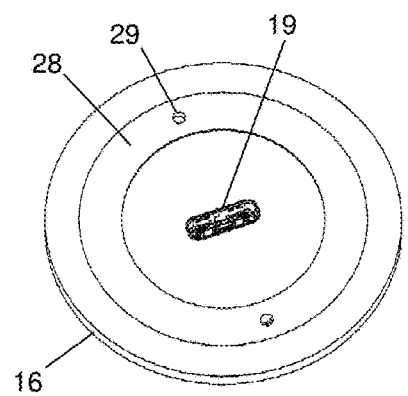
FIG. 13 is a perforated socket cover 26 of the present disclosure, where only the external thread 10 and screw hole 11 of the socket of FIG. 7 are covered while exposing the USB-C jack 19.

FIG. 13 is the use of the perforated socket cover 28 of the present disclosure to cover the external threads 10 and screw holes 11 of the socket of FIG. 7 for beautiful appearance. However, the USB-C jack 19 is exposed. The perforated socket cover 28 may have an internal thread, which is screwed on the external thread 10, or can be tightly fitted with the sinking groove of the external thread 10. 29 are two small holes that are convenient for screwing the cover 28 to loosen or take out. The outer surface of the perforated socket cover 28 is flush with the end surface of the USB-C socket 19, so that the socket shown in FIG. 7 becomes a traditional USB-C socket. The conventional USB-C connector plug 26 can be inserted into the jack 19 to be connected electrically without being affected. At this time, the USB-C connector plug with flange and internal thread locking cap, or screw through-hole and screws can also be inserted into the socket 19 to be connected electrically. But because of the existence of the socket cover 28, the plug cannot be fixed mechanically.

Figure 14:
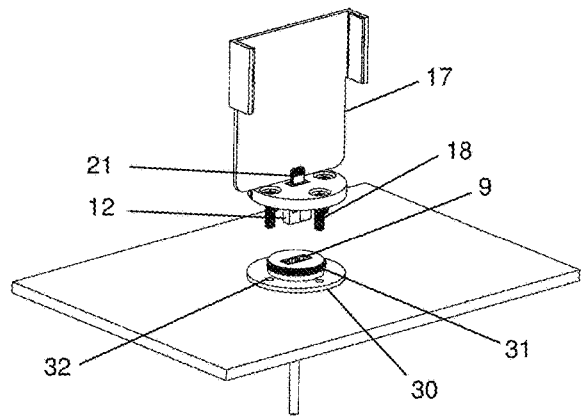
FIG. 14 is a scene in which the USB connector socket 30 with raised external threads and screw holes of the present disclosure is matched with a USB plug mobile phone holder with screw through-holes and screws.
Figure 15:
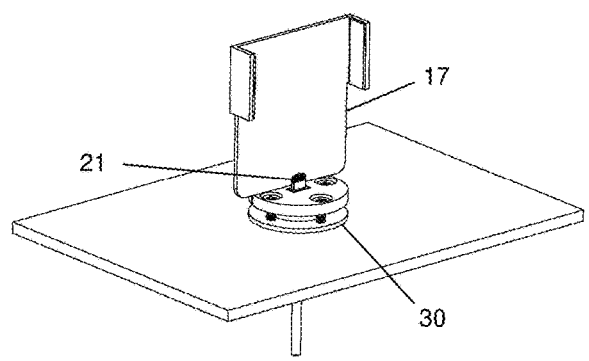
FIG. 15 is an assembly drawing of FIG. 14.

FIG. 14 is a scene in which the USB connector socket 30 with raised external threads and screw holes is matched with a USB plug mobile phone holder with screw through-holes and screws. 31 is a raised external thread. 32 are 4 screw holes. The USB plug electrode 12 is inserted into the USB jack 9 to be connected electrically. The 4 screws 18 are matched with the 4 screw holes 32 to fix the plug and the screw through-hole flange of the mobile phone holder on the USB connector socket 30. FIG. 15 is an assembly drawing of FIG. 14. The Lightning type mobile phone connector plug electrode 21 on the mobile phone holder can be inserted into the Lightning socket of the Apple mobile phone 22 to be connected electrically, and the mobile phone connection holding mechanism 17 fixes the Apple mobile phone 22. The sunken external thread has a small raised part, and it feels clean and not in the way. However, the raised external thread is easy for human eyes to see the external thread, and it is also easy to screw the internal thread locking cap onto the external thread.

Figure 16:
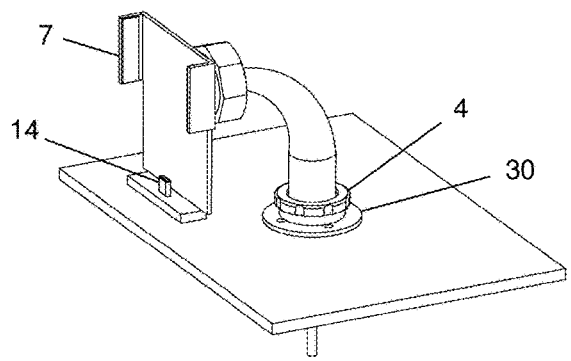
FIG. 16 is a scene in which the USB connector socket 30 with raised external threads and screw holes matches the USB connector plug mobile phone holder with flange and internal thread locking cap.

FIG. 16 is a scene in which a USB connector socket 30 with a raised external thread and screw holes is matched with a USB plug mobile phone holder with a flange and internal thread locking cap. The USB plug electrode 12 is inserted into the USB jack 9 to be connected electrically. The internal thread locking cap 4 is matched with the raised external thread 31 to squeeze the plug flange 13 to fix the USB plug of the mobile phone holder on the USB connector socket 30.

FIG. 17 is a schematic diagram of the electrical connection between the USB-C connector socket 16 and the car. The USB-C connector has 24 electrodes and is a high-speed serial data communication, which can be used for electrical power connection and signal connection. The jack electrode 19 of the USB-C connector socket 16 is connected to the electric wire 3 inside the socket, and the electric wire 3 is connected to the connection converter 33 of the car to transmit power and signals. On the connection converter 33 of the car, there are many other wires or connectors, including the power cord 34, the audio input microphone line 35, the audio output car speaker line 36, the image input camera line 37, the image output display line 38, the car sensor input line 39, car control output line 40. The car can also receive signals from the outside wirelessly or do wireless two-way communication, so there will be car antenna wires or connectors for mobile phone communication 41, mobile data communication 42, Wi-Fi communication 43, Bluetooth communication 44, walkie-talkie phone communication 45, satellite navigation signal reception 46, radio signal 47, TV signal 48. Among one or more of the wires or connectors 34 to 48, they are separated wires with parallel communication; or public wires with serial communication; or a composite type of parallel communication and serial communication. The physical number of wires, connectors, or car antennas is reduced, and it can be easily made with high performance. The connection converter 33 of the car is a simple wire connector, or a converter or signal processor with a complicated processing circuit. The car sensor input line 39 may be an input line for detecting the vehicle's own condition or operating condition, so as to be used for recording or automatic driving. The car control output line 40 may be an output line for manipulating the operation of the car, such as automatic driving.

The car infotainment system is an integrated system that combines hardware and software in a car. It provides audio and video content to the driver or passenger in the form of information and entertainment. It also play an important role in auto-driving or car detection and control. The connection converter 33 of the car is the central component of the main connection control of the car infotainment system. More than 20 years ago, Cars had radios and CD players. Mobile phones could also transmit sound signals to the car through AUX audio cables. The car speakers produced high-quality sound. In recent years, there have been good operating screens in cars, and mobile phone applications can be operated on the car, for mobile phone satellite navigation, phone calls, music playback, etc. The car speakers produce high-quality sound, and the car large screen shows images. Such a car infotainment system is called a smart car infotainment system. Apple's product CarPlay, Google's product Android Auto, and Baidu's product CarLife are widely used smart car infotainment systems.

The multi-functionalization of mobile phones enables mobile phones to become part of the car infotainment system. Meanwhile, the basic condition is that the mobile phone needs to have electrical power at all times to enable the mobile phone to communicate with other parts of the car's in-vehicle infotainment system. In the car mobile phone connection device of the present disclosure, the power and signal of the USB connector socket of the car pass through the USB connector plug, the mobile phone connector plug of the mobile phone connection holding mechanism, and directly connect to the connector socket of the mobile phone to supply power and signal to the mobile phone, and no additional charging signal line is required. At the same time, the mobile phone connection holding mechanism is also firmly supported on the USB connector socket of the car through the USB connector plug. The component of the USB connector plug and the mobile phone connection holding mechanism are likely to become a car aftermarket product that is not sourced from the car's maker. Therefore, it can be easily designed into various shapes by many after-market product companies. For example, the support rod 5 can be designed to be adjustable in length, direction, and position, which is convenient for car drivers or passengers to operate on a mobile phone. When the phone is not in operation or in use, it can be adjusted to a less obstructive shape. The mobile phone connection and holding mechanism can also be designed in various shapes.

The mobile phone connection holding mechanism can also have a magnet wireless charging board, which get power connection from the USB connector plug through the internal wiring or circuit. When human hand moves the mobile phone near the wireless charging board, the magnet attracts the iron parts or magnet parts on the mobile phone, so that the mobile phone is attracted to the wireless charging board to power or charge the mobile phone. At this time, the mobile phone can communicate with other parts of the car infotainment system or with the car's connection converter 33 through Wi-Fi, Bluetooth or NFC wireless electrical communication. The wireless charging board can also have gripping claws to hold the mobile phone.

In the car mobile phone connection device of the present disclosure, the mobile phone is connected electrically to the mobile phone connector plug on the holding mechanism. According to the USB power supply protocol, the mobile phone is connected electrically with a fixed voltage and current power supply, or a variable voltage or current, or smart fast and slow Recharge. USB Power Delivery (USB PD) is a relatively new fast charge standard. In May 2021, the USB Promoter Group announced the release of the USB Power Delivery (USB PD) Revision 3.1 specification to enable delivering up to 240 W of power over the USB Type-C cable and connector. The wireless charging board can adjust the wireless transmission power to power on the mobile phone or intelligently charge quickly and slowly. The wireless charging board can also have the function of transmitting and receiving NFC wireless electrical communication signals.

In the car mobile phone connection device of the present disclosure, the mobile phone is set on the mobile phone connection holding mechanism, and is operated directly on the phone. The mobile phone speaker produces sound or the mobile phone display shows the image; Or the mobile phone communicates with other parts of the car infotainment system or with the car's connection converter through wired electrical connection of the mobile phone connector socket, or through Wi-Fi, Bluetooth or NFC wireless electrical communication, so that there is one or more of the following characteristics:

(1) Use voice input, touch or key input on the mobile phone, to operate mobile application Apps, perform satellite navigation, play sound, play video, listen to the radio, watch TV, browse internet, make phone calls, or do text and video communications. The sound is produced by the car speakers, or the image is shown on the display of the car infotainment system;

(2) Use voice input, touch or key input on the car infotainment system, to operate mobile application Apps, perform satellite navigation, play sound, play video, listen to the radio, watch TV, browse internet, make phone calls, or do text and video communications. The sound is produced by the car speakers, or the image is shown on the display of the car infotainment system;

(3) Operate on the mobile phone or operate on the car infotainment system, to use the internal antenna of the mobile phone, or use the car's antenna for mobile phone communication, mobile data communication, Wi-Fi communication, Bluetooth communication, walkie-talkie phone communication, satellite navigation signal receiving, radio signal receiving, or TV signal receiving. The internal antenna of the mobile phone is small and has relatively poor performance. Car antennas can be large in size and can achieve high performance, which is conducive to sending and receiving weak wireless signals, adjusting the directivity of the antenna, and improving the speed or bandwidth of receiving or two-way wireless communication.

FIG. 18 is a scene in which a USB-C connector socket 16 is used to connect and fix a mobile phone on the vertical surface of a car dashboard. FIG. 19 is the USB-C connector plug of FIG. 18. The USB-C connector socket 16 is installed on the vertical surface 49 of the car dashboard. The USB-C connector plug electrode 20 is inserted into the socket, and the internal thread 51 of the screw locking cap 4 is screwed on the external thread of the socket 16. So as to fix the USB-C connector plug. The end surface of the USB-C connector plug has an annular groove, and the rubber ring 52 is placed in the annular groove. When the screw locking cap 4 is tightened, the bottom surface of the annular groove of the plug end face and the socket end face squeeze the rubber ring 52, so that the plug end face and the socket end face are sealed to obtain waterproof, dustproof, airtight, and protect the USB-C connector electrode in good contact status. By designing the depth from the end surface of the plug to the bottom surface of the annular groove, the squeezing amount of the rubber ring 52 can be controlled to ensure that the rubber ring 52 is in the best squeezed state. 53 is a ball hinge. 54 is a wire connected to the plug electrode 20. Loosening the ball hinge locking nut 6 can adjust the direction of the mobile phone connecting to the holding mechanism 7 and then lock it. The connector socket of the mobile phone is sleeved on the mobile phone connector plug of the mobile phone connection holding mechanism for electrical connection. The mobile phone is also fixed on the mobile phone connection holding mechanism to facilitate one-handed operation, sound operation or watching.

Figures 22, 23:
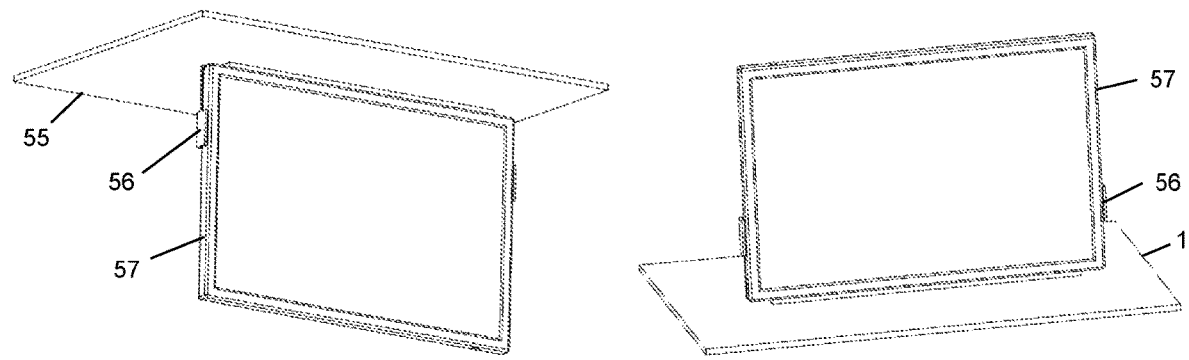
FIG. 22 is the front of the tablet computer of FIG. 20.
FIG. 23 is a scene of using the USB-C connector socket 16 to connect and fix the tablet computer 57 on a horizontal upper surface.

FIG. 20 is a scene where the USB-C connector socket 16 is used to connect and fix a large-screen tablet computer on the ceiling of a car. FIG. 21 is the USB-C connector plug of FIG. 20. 55 is the ceiling, 56 is the tablet computer connection holding mechanism, and 57 is the tablet computer. The USB-C connector socket 16 is installed on the car ceiling 55, the USB-C connector plug electrode 20 is inserted into the socket, and the internal thread of the screw locking cap 4 is screwed on the external thread of the socket 16 to fix the USB-C connector plug. The end surface of the USB-C connector plug has an annular groove, and the rubber ring 52 is placed in the annular groove. When the screw locking cap 4 is tightened, by squeezing the flange 13, the bottom surface of the annular groove of the plug end face and the socket end face squeeze the rubber ring 52, so that the plug end face and the socket end face are sealed to obtain waterproof, dustproof, airtight, and protect the USB-C connector electrode in good contact status. 53 is a ball hinge, 54 is a wire connected to the plug electrode 20. Loosening the ball hinge locking nut 6 can adjust the direction of the tablet computer connecting to the holding mechanism 56 and then lock it. The connector socket of the tablet computer is sleeved on the tablet computer connector plug of the tablet computer connection holding mechanism for electrical connection. The tablet computer is also fixed on the tablet computer connection holding mechanism at the same time to facilitate one-handed operation, sound operation or watching. FIG. 22 is the front of the tablet computer of FIG. 20; FIG. 23 is a scene where the tablet computer can be connected and fixed on a horizontal upper surface in the same way.

Figures 24, 25:
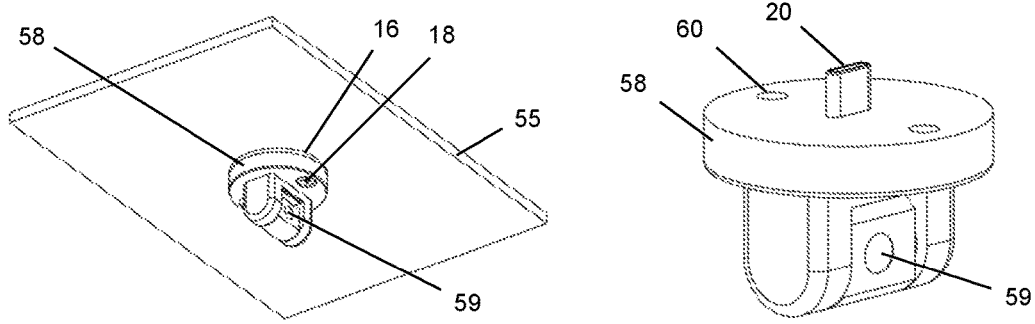
FIG. 24 is a scene where the USB-C connector socket 16 is used to connect and fix a camera on the ceiling of a car.
FIG. 25 is the camera of FIG. 24.

FIG. 24 is a scene where the USB-C connector socket 16 is used to connect and fix a camera on the ceiling of a car. FIG. 25 is a video camera. 58 is the camera base. 18 are the fixing screws, there are two in total. 59 is the camera lens. 60 are the two screw through-holes. The USB-C connector plug electrode 20 of the camera is inserted into the socket of the USB-C socket installed on the ceiling, and the two screws 18 are screwed to the screw holes of the USB-C socket through the through-holes 60 to fix the camera and prevent the camera from falling off. The lens direction of the camera can be adjusted by 360° horizontal rotation and 180° vertical rotation relative to the base 58.

The above-mentioned USB-A connector socket, or USB-C connector socket, are installed on one or more of the front panel of the car dashboard, the upper panel of the car dashboard, the back of the car seat, the front ceiling of the car, the middle ceiling of the car, the rear ceiling of the car, the inside of the car window, the outside of the car roof, the outside of the car head, the exterior of the rear of the car, the exterior of both sides of the car, or on motorcycles, trains, ships, airplanes, buildings, instruments and equipment.

The mobile phone connection holding mechanism of the car mobile phone connection device of the present disclosure, can be replaced with GPS satellite navigator, notebook computer, tablet computer, TV, display, camera, radar, lighting display board, searchlight, toy, lighting, fragrance, detector, electrical socket, electrical plug, socket extension converter, USB memory, USB audio player, USB video player, USB socket, USB interface extension converter, HDMI socket, electric heating cup, electric fan, wireless charger, wireless NFC communicator, coat hook, or its electrical connection holding mechanisms, so that they are mechanically fixed and get power or signal connection at the same time.

Figures 26, 27:
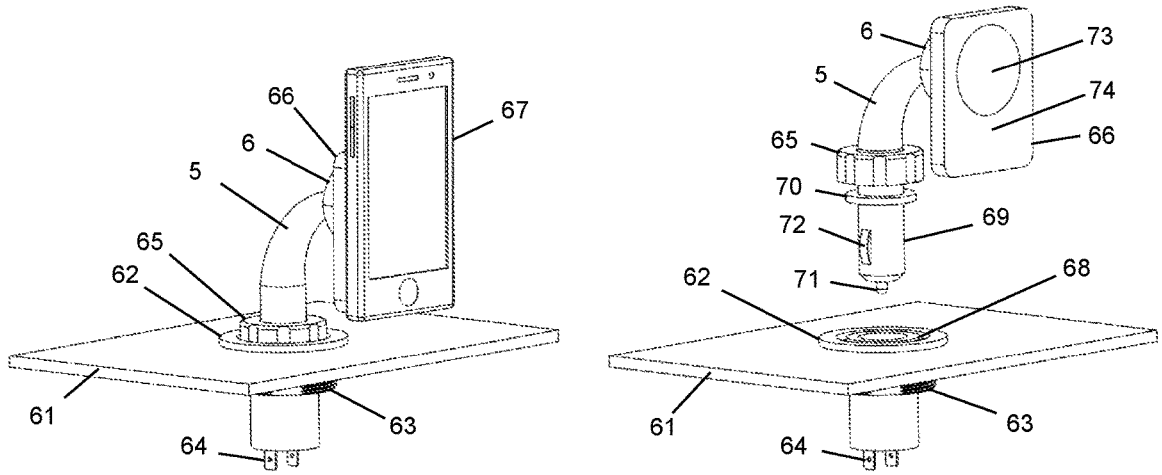
FIG. 26 is a scene of using the car cigarette lighter socket plug to connect and fix the mobile phone 67 on the upper surface of the car dashboard.
FIG. 27 is an exploded view of FIG. 26.

FIG. 26 is a scene of the present disclosure using the car cigarette lighter socket and plug to connect and fix the mobile phone on the upper surface of the car dashboard. Compared with FIG. 1, the USB connector socket and plug have been replaced with a car cigarette lighter socket and plug. 61 is the upper surface panel of the dashboard. 62 is the car cigarette lighter socket installed on the upper surface of the dashboard. 63 is the external thread on the car cigarette lighter socket fixed to the upper surface plate, the threaded ring of the socket is screwed on the external thread 63 to press the upper surface plate to fix the car cigarette lighter socket 62. 64 is the electrode connecting the car cigarette lighter socket and the outside, generally there are two, and can be increased to 3 poles or more. Correspondingly, the electrode of the car cigarette lighter plug is also two or 3 poles or more. 65 is the threaded locking cap of the car cigarette lighter plug, which matches with the sunken external thread on the car cigarette lighter socket 62 to lock and fix the car cigarette lighter plug. 5 is a curved pole. 6 is a ball hinge locking nut of a mobile phone holder. 66 is a mobile phone magnetic wireless charging board of a mobile phone holder, with magnets and mobile phone wireless charging devices, which is also a mobile phone power supply holding mechanism. 67 is a mobile phone with iron parts or magnets. The mobile phone magnetic wireless charging board 66 and the mobile phone 67 are fixed together by magnetic attraction, and the mobile phone is wirelessly charged at the same time.

FIG. 27 is an exploded view of FIG. 26, without showing the mobile phone 67. 68 is the sunken external thread on the car cigarette lighter socket. 69 is the cylinder of the car cigarette lighter plug. 70 is the flange of the car cigarette lighter plug. 71 is an electrode of the car cigarette lighter plug, for example, has a voltage of +12V. 72 is another electrode of the car cigarette lighter plug, for example, has a voltage of 0V. The car cigarette lighter plug cylinder 69 is inserted into the jack of the car cigarette lighter socket 62, and the lower surface of the flange 70 contacts the upper surface end surface of the car cigarette lighter socket 62. The plug electrodes 71 and 72 are in contact and conduction with the electrodes of the socket 62, and further connected to the externally connected electrode 64. The threaded locking cap 65 of the plug is matched with the sunken external thread 68 of the socket, and the upper surface of the flange 70 is tightened to fix the car cigarette lighter plug. The end surface of the flange 70 of the car cigarette lighter plug may have an annular groove, and a rubber ring is placed in the annular groove. When the threaded locking cap 65 is tightened, by squeezing the flange 70, the bottom surface of the annular groove and the end surface of the socket squeeze the rubber ring 52, so that the flange end surface and the socket end surface are sealed to obtain waterproof, dustproof, airtight, and protect the connector electrode in good contact status.

Numeral reference 73 represents a wireless charging device for mobile phones. Numeral reference 74 represents a magnet, and there are one or more. The wireless charging device 73 and the magnet 74 of the mobile phone constitute a magnetic wireless charging board 66 for the mobile phone. When there are two or more magnets and the mobile phone 67 is moved near the magnet by a human hand, multiple magnets attract the iron or magnet on the mobile phone to locate the position and direction of the mobile phone 67, so that the mobile phone is attracted to the mobile phone magnetic wireless charging board 66. When there are two sets of magnets, the direction of the mobile phone can be attracted by the magnets into a vertical or horizontal orientation. The wireless charging device 73 is electrically connected to the plug electrodes 71 and 72 of the car cigarette lighter through a processing circuit, so as to energize or charge the mobile phone.

Figure 28:
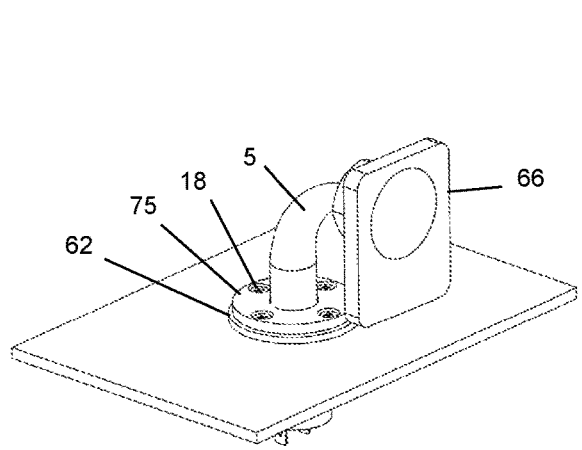
FIG. 28 is a scene in which the magnetic wireless charging board mobile phone holder is connected and fixed to the cigarette lighter socket 62 by using screws.
Figure 29:
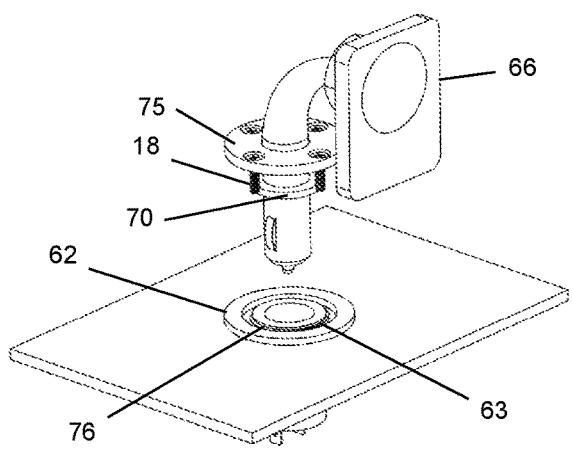
FIG. 29 is an exploded view of FIG. 28.

FIG. 28 is a scene in which the magnetic wireless charging board mobile phone holder is connected and fixed to the cigarette lighter socket 62 of the car by using screws. FIG. 29 is an exploded view of FIG. 28. Numeral reference 75 represents a screw through-hole plate for fixing the flange 70 of the car cigarette lighter plug. Numeral reference 76 represents the screw hole on the car cigarette lighter socket. The four screws 18 are screwed on the screw holes 76 through the screw through-holes on the screw through-hole plate 75, and the flange 70 is pressed to be fixed on the cigarette lighter socket 62 of the car.

Figure 30:
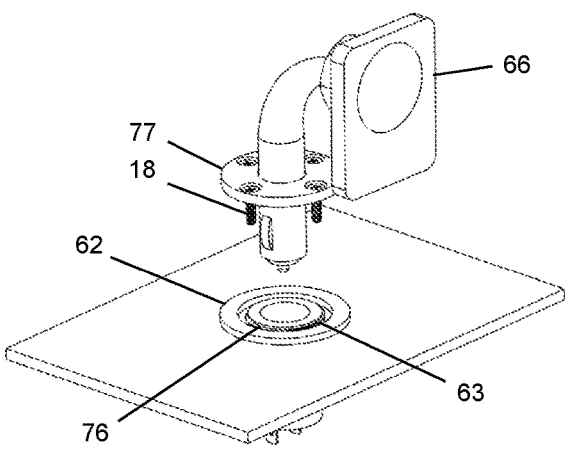
FIG. 30 combines the flange 70 and the fixing plate 75 of FIG. 29 into a large flange 77.

FIG. 30 combines the flange 70 and the screw through-hole plate 75 into a large flange 77, which has screw through-holes, and is called screw through-hole flange. The four screws 18 are screwed on the screw holes 76 of the socket 62 through the screw through-holes of the large flange 77 for fixing. There may be only two or three screw holes 76, and at this time, only two or three screws 18 are used accordingly.

Figure 31:
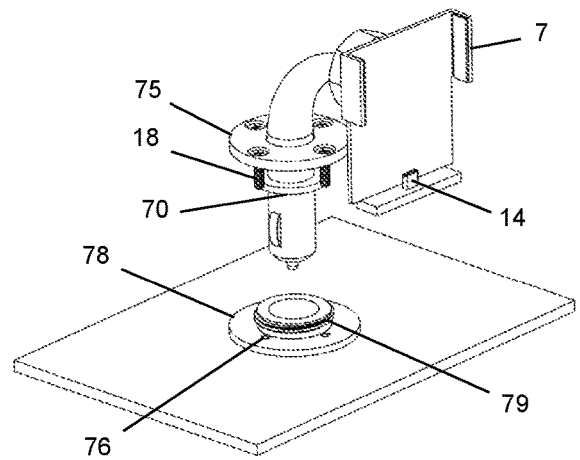
FIG. 31 replaces the sunken external thread in FIG. 29 with a raised external thread car cigarette lighter socket 78.
Figure 32:
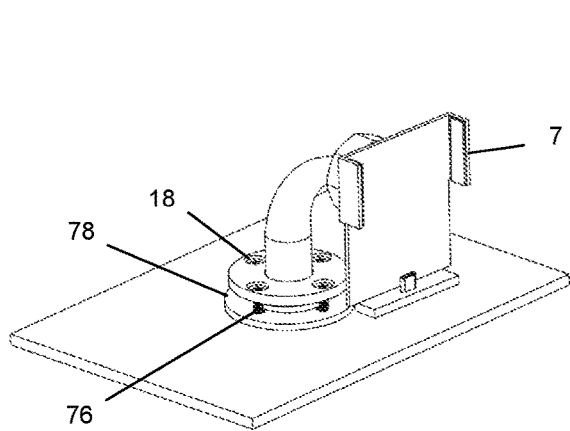
FIG. 32 is an assembly drawing of FIG. 31.

FIG. 31 replaces the sunken external threaded car cigarette lighter socket 62 in FIG. 29 with a raised external threaded car cigarette lighter socket 78. 79 is a raised external thread. The four screws 18 are screwed on the screw holes 76 through the screw through-holes on the fixing plate 75, and the flange 70 is pressed to be fixed on the cigarette lighter socket 78 of the car. FIG. 32 is an assembly drawing of FIG. 31.

Figure 33:
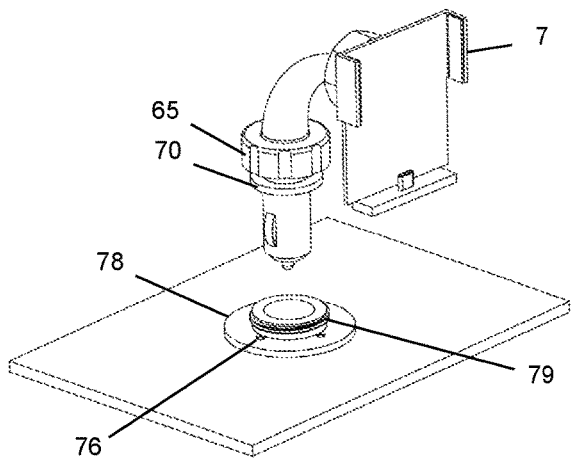
FIG. 33 replaces the fixing plate 75 and the screw 18 of the car cigarette lighter plug in FIG. 31 with an internal thread locking cap 65.
Figure 34:
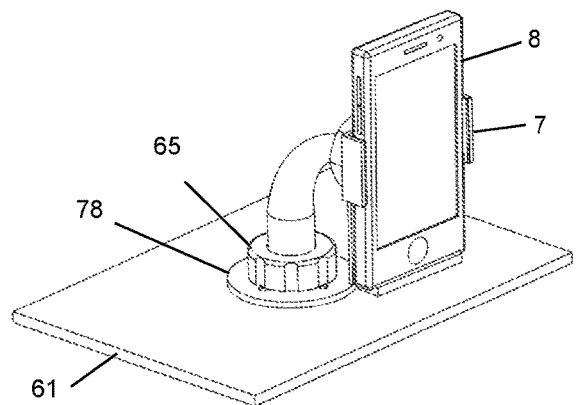
FIG. 34 is an assembly drawing of FIG. 33.

FIG. 33 replaces the screw through-hole plate 75 and the screw 18 of the car cigarette lighter plug in FIG. 31 with an internal thread locking cap 65. The threaded locking cap 65 of the plug is matched with the raised external thread 79 of the socket 78, and the upper surface of the flange 70 is tightened to fix the car cigarette lighter plug. FIG. 34 is an assembly drawing of FIG. 33.

Figure 35:
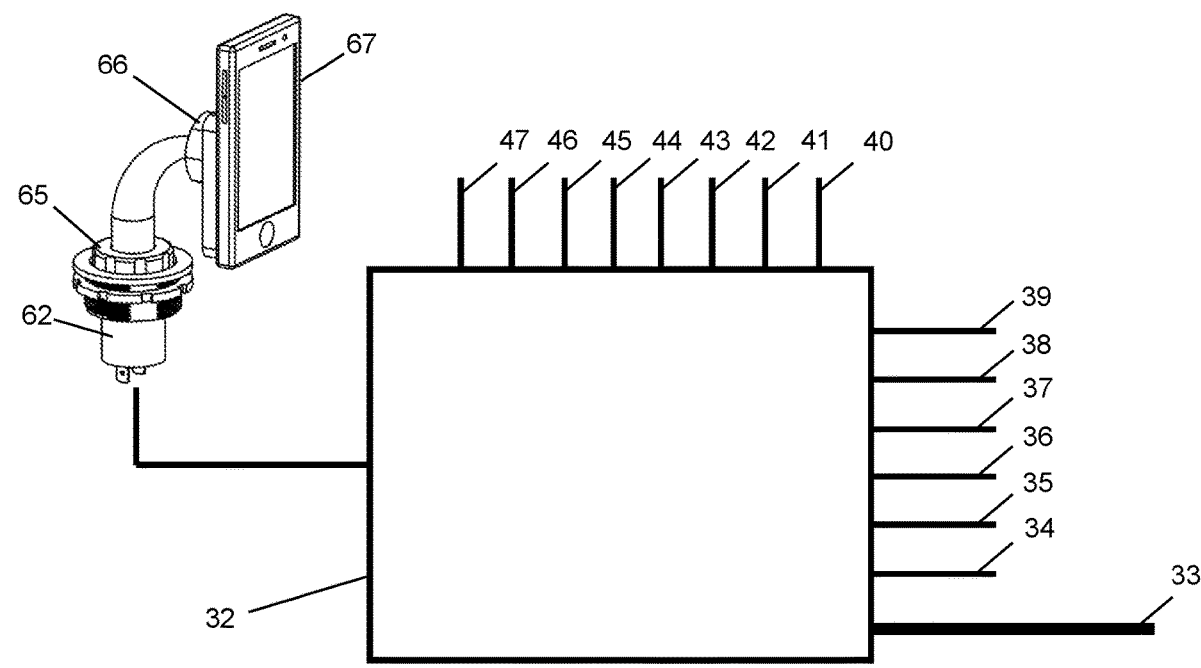
FIG. 35 is a schematic diagram that the mobile phone 67 is electrically connected to the car through the car cigarette lighter socket 62.

FIG. 35 is a schematic diagram of the electrical connection between the mobile phone 67 and the car through the car cigarette lighter socket 62. The car cigarette lighter socket 62 has two electrodes, which are connected to the connection converter 33 of the car for power connection. The mobile phone 67 is fixed on the magnetic wireless charging board 66 and has electricity at all times, which is convenient for one-handed touch operation and watching. The wireless charging board can adjust the wireless transmission power and charge or power on the mobile phone intelligently.

The mobile phone is set on the mobile phone connection holding mechanism, and is operated directly on the phone. The mobile phone speaker produces sound or the mobile phone display shows the image; Or the mobile phone communicates with other parts of the car infotainment system or with the car's connection converter through wired electrical connection of the mobile phone connector socket, or through Wi-Fi or Bluetooth wireless communication, so that there is one or more of the following characteristics:
  (1) Use voice input, touch or key input on the mobile phone, to operate mobile application Apps, perform satellite navigation, play sound, play video, listen to the radio, watch TV, browse internet, make phone calls, or do text and video communications. The sound is produced by the car speakers, or the image is shown on the display of the car infotainment system;
  (2) Use voice input, touch or key input on the car infotainment system, to operate mobile application Apps, perform satellite navigation, play sound, play video, listen to the radio, watch TV, browse internet, make phone calls, or do text and video communications. The sound is produced by the car speakers, or the image is shown on the display of the car infotainment system;
  (3) Operate on the mobile phone or operate on the car infotainment system, to use the internal antenna of the mobile phone, or use the car's antenna for mobile phone communication, mobile data communication, Wi-Fi communication, Bluetooth communication, walkie-talkie phone communication, satellite navigation signal receiving, radio signal receiving, or TV signal receiving. The internal antenna of the mobile phone is small and has relatively poor performance. Car antennas can be large in size and can achieve high performance, which is conducive to sending and receiving weak wireless signals, adjusting the directivity of the antenna, and improving the speed or bandwidth of receiving or two-way wireless communication.

Figure 36:
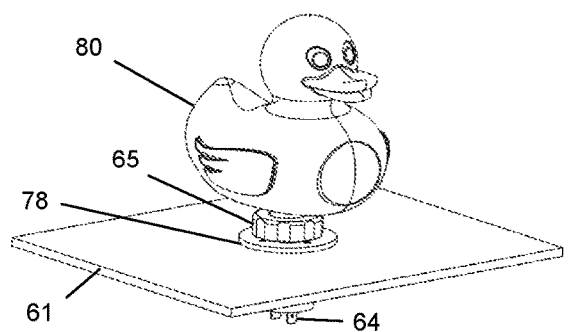
FIG. 36 is a scene that an electric toy duckling 80 is fixed on the cigarette lighter socket of a car.

FIG. 36 is a scene of fixing an electric toy duckling 80 on the cigarette lighter socket of a car. The threaded locking cap 65 of the car cigarette lighter plug is matched with the external thread 79 of the car cigarette lighter socket 78 to fix the electric toy duckling 80 on the car cigarette lighter socket 78. The electrodes of the plug and the socket are also connected at the same time. The electric toy duckling 80 has a microphone, a speaker, a light, and a rotating or shaking function.

Figure 37:
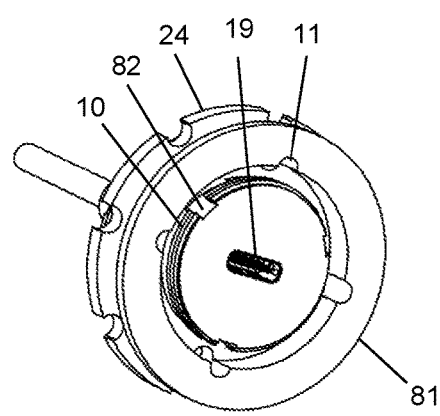
FIG. 37 is a USB-C connector socket 81 of the present disclosure, which has a sunken external thread 10, a screw hole 11, and a sunken bayonet slot 82.
Figure 38:
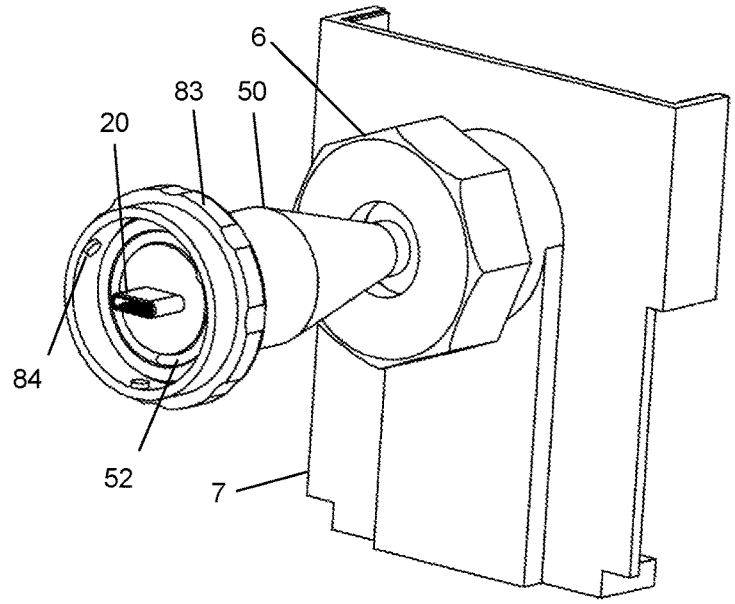
FIG. 38 is a USB-C connector plug mobile phone holder of the present disclosure, with a bayonet locking cap 83.

FIG. 37 is a USB-C connector socket 81 of the present disclosure, which has a sunken external thread 10, a screw hole 11, and a sunken bayonet slot 82. There are 3 bayonet slots 82 in the figure, evenly distributed at 120 degrees. FIG. 38 is a USB-C connector plug mobile phone holder of the present disclosure, with a bayonet locking cap 83. There are three bayonet claws 84 on the bayonet locking cap 83 to fit with the bayonet slot 82. When the connection is fixed, the USB-C plug electrode 20 is inserted into the USB-C jack 19 of the socket 81, and the rubber ring 52 on the end face of the plug flange contacts the end face of the socket 81. The three bayonet claws 84 on the bayonet locking cap 83 are inserted into the three bayonet slots 82 of the socket 81, and the bayonet locking cap 83 is rotated to make the bayonet claws 84 screw on the bayonet slot 82. The rotation matching of the bayonet claw 84 to the bayonet slot 82 makes the bayonet locking cap 83 and the end face of the socket squeeze the plug flange and the rubber ring 52 to be fixed, and it also has waterproof performance. At the same time, the electrodes of the plug and the socket also get good electrical contact connection, which becomes the appearance of FIG. 18. Compared with the external thread method, the bayonet method has a faster assembling and disassembling speed, but the firmness is poor.

Figure 39:
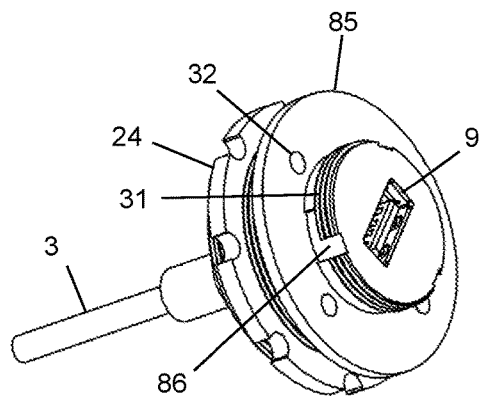
FIG. 39 is a USB-A connector socket 85 of the present disclosure, which has a raised external thread 32, a screw hole 32, and a raised bayonet slot 86.
Figure 40:
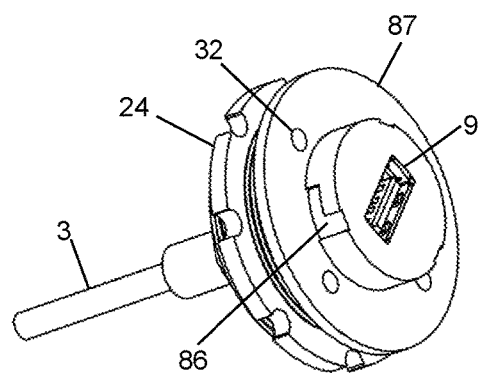
FIG. 40 is a USB-A connector socket 87 of the present disclosure, has a screw hole 32, and a raised bayonet slot 86, without a raised external thread 32.

FIG. 39 is a USB-A connector socket 85 of the present disclosure, which has a raised external thread 32, a screw hole 32, and a raised bayonet slot 86. FIG. 40 is a USB-A connector socket 87 of the present disclosure, which has a screw hole 32 and a raised bayonet slot 86, but no raised external thread 32. After the USB-C plug electrode 20 of FIG. 38 is replaced with the USB-A plug electrode 12, it is inserted into the USB-A jack 9 of the socket 85 or 87, and the rubber ring 52 on the end face of the plug flange contacts the end face of the jack 9. The three bayonet claws 84 on the bayonet locking cap 83 are inserted into the three bayonet slots 86 of the socket 85 or 87, and the bayonet locking cap 83 is rotated to screw the bayonet claws 84 on the bayonet slot 86. The rotation matching of the bayonet claw 84 to the bayonet slot 86 makes the bayonet locking cap 83 and the end face of the socket squeeze the plug flange and the rubber ring 52 so as to be fixed, and it also has waterproof performance. At the same time, the electrodes of the plug and the socket also get good electrical contact connection. The number of bayonet slots 86 and mating bayonet claws 84 can also be two or four.

FIG. 41 is a scene of a car cigarette lighter socket 88 of the present disclosure, which is matched with a traditional car cigarette lighter plug 95, separation diagram. 89 is an electrode jack for connecting the cigarette lighter socket 88 and the cigarette lighter plug. 90 is an electrode for connecting the cigarette lighter socket 88 to the outside. 91 is the thread to be used to fix to the car dashboard panel. 92 is a plane to define a rotation direction. 93 is a perforated socket cover, mainly for aesthetic purposes. 94 is a dial hole when the socket cover 93 is installed by rotation. 96 is an electrode of a traditional car cigarette lighter plug 95. 97 is another electrode. The traditional car cigarette lighter plug 95 can be inserted into the jack 89 of the car cigarette lighter socket 88 of the present disclosure for electrical connection, and the feeling is the same as the mating connection with a traditional car cigarette lighter socket.

FIG. 42 is a scene in which the perforated socket cover 93 of FIG. 41 is separated from the car cigarette lighter socket 88. 98 is a sunken external thread. 99 is a sunken bayonet slot. 100 is the internal thread of the perforated socket cover 93, which is rotatably matched with the sunken external thread 98 to fix the perforated socket cover 93.

FIG. 43 is the front of the car cigarette lighter socket 88 after the perforated socket cover 93 is separated. At this time, the sunken external thread 98, the sunken bayonet slots 99 and the screw holes 101 are exposed, in order to match with the car cigarette lighter plug with flange and internal thread locking cap, flange and bayonet locking cap, flange and screw through-hole plate and screws, or screw through-hole flange and screws, so that the plug and the socket are electrically connected and mechanically fixed at the same time. Here, there are three bayonet slots 99 and three screw holes 101.

FIG. 44 is a scene of a USB-A connector socket 85 with a raised external thread 32, screw holes 32, and a raised bayonet slot 86, and a perforated socket cover 102 is installed. It is simple and does not affect the electrical connection with the traditional USB-A plug.

The above-mentioned car cigarette lighter sockets are installed on one or more of the front panel of the car dashboard, the upper panel of the car dashboard, the back of the car seat, the front ceiling of the car, the middle ceiling of the car, the rear ceiling of the car, the inside of the car window, the outside of the car roof, the outside of the car head, the exterior of the rear of the car, the exterior of both sides of the car, or on motorcycles, trains, ships, airplanes, buildings, instruments and equipment.

The mobile phone holder of the present disclosure, is replaced with GPS satellite navigator, notebook computer, tablet computer, TV, monitor, camera, radar, lighting display board, searchlight, toy, lighting lamp, fragrance, detector, electrical socket, electrical plug, socket extension converter, Car cigarette lighter socket expansion converter, USB socket, USB interface expansion converter, HDMI socket, electric heating cup, electric fan, wireless charger, coat hook, or its electrical connection device holder, so that it gets fixed mechanically and gets connected electrically with power at the same time.

The above-mentioned USB-A connector socket, or USB-C connector socket, has a sunken external thread, a raised external thread, a sunken bayonet slot, a raised bayonet slot, a screw holes, a sunken external thread and bayonet slot, a raised external thread and bayonet slot, a sunken external thread and screw holes, a raised external thread and screw holes, a sunken external bayonet slot and screw holes, a raised external bayonet slot and screw holes, a sunken external thread and bayonet slot plus screw holes, or a raised external threads and bayonet slots plus screw holes, 13 types of shape in total; Or, car cigarette lighter socket, has a sunken external thread, a sunken bayonet slot, a raised bayonet slot, a screw holes, a sunken external thread and bayonet slot, a raised external thread and bayonet slot, a sunken external thread and screw holes, a raised external thread and screw holes, a sunken external bayonet slot and screw holes, a raised external bayonet slot and screw holes, a sunken external thread and bayonet slot plus screw holes, or a raised external threads and bayonet slots plus screw holes, 12 types of shape in total; The above-mentioned matching plug of the mobile phone holder, has a flange and internal thread locking cap, a flange and bayonet locking cap, a flange and screw through-hole plate and screws, or a screw through-hole flange and screws, 4 kinds of structures in total.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A car mobile phone connection device comprising: a USB connector socket or a mobile phone holder composed of a matching USB connector plug and a mobile phone connection holding mechanism; wherein, the USB connector socket, in addition to USB connector jack electrodes, also has sunken external thread, raised external thread, sunken bayonet slot, raised bayonet slot, screw holes, sunken external thread and bayonet slot, raised external thread and bayonet slot, sunken external thread and screw holes, raised external thread and screw holes, sunken external bayonet slot and screw holes, raised external bayonet slot and screw holes, sunken external thread and bayonet slot plus screw holes, or raised external threads and bayonet slots plus screw holes; the matching USB connector plug of the mobile phone holder, in addition to the matching USB connector plug electrodes, also has flange and internal thread locking cap, flange and bayonet locking cap, flange and screw through-hole plate and screws, or screw through-hole flange and screws; the mobile phone connection holding mechanism of the mobile phone holder has one or more of a mobile phone connector plug, wireless charging board, NFC communication board, which are connected to a mating USB connector plug through internal or external circuits; the USB connector socket is installed on the car, and the mobile phone is installed on the mobile phone connection holding mechanism; a mobile phone socket is sleeved on the mobile phone connector plug of the mobile phone connection holding mechanism for wired connection, in order to perform fixed voltage or current power supply, variable voltage or current power supply, or smart fast and slow charging according to the power supply protocol; or the mobile phone is closed to one or more of the wireless charging board or the NFC communication board of the mobile phone connection holding mechanism for wireless power connection or wireless signal connection; for wireless power connection, the mobile phone is powered or intelligently fast and slow charged through wireless charging board by fixed or adjustable wireless transmission power according to corresponding wireless power supply protocol; wherein the external thread, the bayonet slot USB connector socket, and the matching mobile phone holder further have a set of characteristics including: a mating USB connector plug with flange and internal thread locking cap, or flange and bayonet locking cap, inserts into the external thread or bayonet slot USB connector socket, such that: the flange end face of the mating USB connector plug contacts the inlet end face of the bayonet slot USB connector socket; screw the internal thread of the locking cap of the mating USB connector plug into the external thread of the bayonet slot USB connector socket, or insert and screw the bayonet claw of the locking cap of the mating USB connector plug into the bayonet slot of the bayonet slot USB connector socket, so that the locking cap and the bayonet slot USB connector socket clamp the flange; the mating USB connector plug and the bayonet slot USB connector socket are electrically connected, and at the same time they are mechanically fixed by threads or bayonet; the mobile phone connection holding mechanism is fixed with the matching USB connector plug, and also supports the mobile phone; the external thread or bayonet slot USB connector socket is inserted by a traditional mating USB connector plug without flange and internal thread locking cap, nor flange and bayonet locking cap, such that: the external thread or bayonet slot of the bayonet slot USB connector socket is not used for matching with the traditional plug; the bayonet slot USB connector socket and the traditional plug are electrically connected without mechanical threads or bayonet locking; the mating USB connector plug with flange and internal thread locking cap, or flange and bayonet locking cap, inserts into a traditional USB connector socket without external threads nor bayonet slot, such that: the flange end face of the mating USB connector plug touches or does not touch the inlet end face of the traditional socket; the internal thread locking cap or bayonet locking cap of the mating USB connector plug is not used for matching with the traditional socket; the mating USB connector plug and the traditional socket are electrically connected without mechanical threads or bayonet locking; or, the set of characteristics alternatively comprise: the mating USB connector plug with flange and screw through-hole plate and screws, or screw through-hole flange and screws inserts into the screw hole USB connector socket, such that: the end face of the flange or the screw through-hole flange of the mating USB connector plug contacts the inlet end face of the socket; the screws of the plug go through the through-holes of the screw through-hole plate or the screw through-hole flange, and screw into the screw holes of the bayonet slot USB connector socket, so that the screw through-hole plate and the bayonet slot USB connector socket clamp the flange, or the screws and the socket clamp the screw through-hole flange; the mating USB connector plug and socket are electrically connected, and at the same time they are mechanically fixed by screws; the mobile phone connection holding mechanism is fixed with the matching USB connector plug, and also supports the mobile phone; the screw hole USB connector socket is inserted by the traditional mating USB connector plug without flange and screw through-hole plate and screws, nor screw through-hole flange and screws, thereby: the screw holes of the socket are not used for matching with traditional plugs; the socket and the traditional plug are electrically connected without mechanical screw locking; the mating USB connector plug with flanges and screw through-hole plate and screws, or screw through-hole flange and screws, inserts into the traditional USB connector socket without screw holes, thereby: the end face of the flange or the screw through-hole flange of the mating USB connector plug contacts or does not contact the inlet end face of the socket; the screws of the mating USB connector plug are not used for matching with the traditional socket; and the mating USB connector plug and the traditional socket are electrically connected without mechanical screw locking; wherein the USB connector sockets with external thread and bayonet slot, external thread and screw holes, external bayonet slot and screw holes, or external thread and external bayonet slot and screw holes, are configured to accept the mating USB connector plug with flange and internal thread locking cap, flange and bayonet locking cap, flange and screw through-hole plate and screws, or screw through-hole flange and screws at different times; according to the above operation, the mating USB connector plug and the bayonet slot USB connector socket are electrically connected with mechanically fixing for same locking mating type or without mechanically fixing for different locking mating type.

2. The car mobile phone connection device of claim 1, wherein the type of the USB connector is Type-A or Type-C, or is replaced with the HDMI connector; the sunken or raised socket has a perforated socket cover.

3. The car mobile phone connection device of claim 1, wherein the mobile phone is set on the mobile phone holder, and is operated directly on the phone; the sound is produced by the phone speaker, or the image is shown on the phone display; Or the mobile phone gets the wired power or signal connection with other parts of the car infotainment system or with the car's connection converter through the mobile phone connector socket, or gets the wireless signal connection through Wi-Fi, Bluetooth or NFC wireless communication, such that:

use voice input, touch or key input on the mobile phone, to operate mobile application Apps, perform satellite navigation, play sound, play video, listen to the radio, watch TV, browse internet, make phone calls, or do text and video communications; the sound is produced by the car speakers, or the image is shown on the display of the car infotainment system;

use voice input, touch or key input on the car infotainment system, to operate mobile application Apps, perform satellite navigation, play sound, play video, listen to the radio, watch TV, browse internet, make phone calls, or do text and video communications; the sound is produced by the car speakers, or the image is shown on the display of the car infotainment system;

operate on the mobile phone or operate on the car infotainment system, to use the internal antenna of the mobile phone, or use the car's antenna for mobile phone communication, mobile data communication, Wi-Fi communication, Bluetooth communication, walkie-talkie phone communication, satellite navigation signal receiving, radio signal receiving, or TV signal receiving.

4. The car mobile phone connection device of claim 1, wherein there is a rubber ring between the port of the USB connector socket and the flange or port of the matching USB connector plug, so that high-performance sealing or waterproof performance can be achieved by squeezing the rubber ring.

5. The car mobile phone connection device of claim 1, wherein the USB connector socket of the car mobile phone connection device is installed on one or more of the front panel of the car dashboard, the upper panel of the car dashboard, the back of the car seat, the front ceiling of the car, the middle ceiling of the car, the rear ceiling of the car, the inside of the car window, the outside of the car roof, the outside of the car head, the exterior of the rear of the car, the exterior of both sides of the car, or on motorcycles, trains, ships, airplanes, buildings, instruments and equipment.

6. The car mobile phone connection device of claim 1, wherein the mobile phone holder is configured to hold a GPS satellite navigator, notebook computer, tablet computer, TV, display, camera, radar, lighting display board, searchlight, toy, lighting, fragrance, detector, electrical socket, electrical plug, socket extension converter, USB memory, USB audio player, USB video player, USB socket, USB interface extension converter, HDMI socket, electric heating cup, electric fan, wireless charger, wireless NFC communicator, coat hook, or its electrical connection device holder, so that it gets fixed mechanically or/and gets connected electrically.

7. The car mobile phone connection device of claim 1, wherein:
the mating USB connector plug with flange and screw through-hole plate and screws, or screw through-hole flange and screws inserts into the screw hole USB connector socket, such that:
the end face of the flange or the screw through-hole flange of the plug contacts the inlet end face of the socket;
the screws of the plug go through the through-holes of the screw through-hole plate or the screw through-hole flange, and screw into the screw holes of the socket, so that the screw through-hole plate and the socket clamp the flange, or the screws and the socket clamp the screw through-hole flange;
the plug and socket are electrically connected, and at the same time they are mechanically fixed by screws;
the mobile phone connection holding mechanism is fixed with the matching USB connector plug, and also supports the mobile phone;
the screw hole USB connector socket is inserted by the traditional mating USB connector plug without flange and screw through-hole plate and screws, nor screw through-hole flange and screws, thereby:
the screw holes of the socket are not used for matching with traditional plugs;
the socket and the traditional plug are electrically connected without mechanical screw locking;
the mating USB connector plug with flanges and screw through-hole plate and screws, or screw through-hole flange and screws, inserts into the traditional USB connector socket without screw holes, thereby:
the end face of the flange or the screw through-hole flange of the plug contacts or does not contact the inlet end face of the socket;
the screws of the plug are not used for matching with the traditional socket; and
the plug and the traditional socket are electrically connected without mechanical screw locking.

8. The car mobile phone connection device of claim 7, wherein:
wherein the mobile phone is set on the mobile phone holder, and is operated directly on the phone; the sound is produced by the phone speaker, or the image is shown on the phone display; Or the mobile phone gets the wired power or signal connection with other parts of the car infotainment system or with the car's connection converter through the mobile phone connector socket, or gets the wireless signal connection through Wi-Fi, Bluetooth or NFC wireless communication, such that:
use voice input, touch or key input on the mobile phone, to operate mobile application Apps, perform satellite navigation, play sound, play video, listen to the radio, watch TV, browse internet, make phone calls, or do text and video communications; the sound is produced by the car speakers, or the image is shown on the display of the car infotainment system;
use voice input, touch or key input on the car infotainment system, to operate mobile application Apps, perform satellite navigation, play sound, play video, listen to the radio, watch TV, browse internet, make phone calls, or do text and video communications; the sound is produced by the car speakers, or the image is shown on the display of the car infotainment system;
operate on the mobile phone or operate on the car infotainment system, to use the internal antenna of the mobile phone, or use the car's antenna for mobile phone communication, mobile data communication, Wi-Fi communication, Bluetooth communication, walkie-talkie phone communication, satellite navigation signal receiving, radio signal receiving, or TV signal receiving.

9. A vehicle having one or more mobile phone connection devices each comprising: an automobile USB connector socket having a sunken external thread, raised external thread, sunken bayonet slot, raised bayonet slot, screw holes, sunken external thread and bayonet slot, raised external thread and bayonet slot, sunken external thread and screw holes, raised external thread and screw holes, sunken external bayonet slot and screw holes, raised external bayonet slot and screw holes, sunken external thread and bayonet slot plus screw holes, or raised external threads and bayonet slots plus screw holes; wherein the USB connector socket is matched with a USB connector plug in a mobile phone holder composed of a USB connector plug and a mobile phone connection holding mechanism; wherein, a matching USB connector plug of the mobile phone holder, in addition to matching USB connector plug electrodes, also has flange and internal thread locking cap, flange and bayonet locking cap, flange and screw through-hole plate and screws, or screw through-hole flange and screws; the mobile phone connection holding mechanism of the mobile phone holder has one or more of the mobile phone connector plug, wireless charging board, NFC communication board, which are connected to the mating USB connector plug through internal or external circuits; they have the following characteristics: the USB connector socket is installed on the car, and the mobile phone is installed on the mobile phone connection holding mechanism; a mobile phone socket is sleeved on the mobile phone connector plug of the mobile phone connection holding mechanism for wired connection, in order to perform fixed voltage or current power supply, variable voltage or current power supply, or smart fast and slow charging according to the power supply protocol; or the mobile phone is closed to one or more of the wireless charging board or the NFC communication board of the mobile phone connection holding mechanism for wireless power connection or wireless signal connection; for wireless power connection, the mobile phone is powered or intelligently fast and slow charged through wireless charging board by fixed or adjustable wireless transmission power according to corresponding wireless power supply protocol; wherein: the external thread, a bayonet slot USB connector socket, and the matching mobile phone holder further have a set of characteristics including: a mating USB connector plug with flange and internal thread locking cap, or flange and bayonet locking cap, inserts into the external thread or bayonet slot USB connector socket, thereby: the flange end face of the mating USB connector plug contacts the inlet end face of the bayonet slot USB connector socket; screw the internal thread of the locking cap of the mating USB connector plug into the external thread of the bayonet slot USB connector socket, or insert and screw the bayonet claw of the locking cap of the mating USB connector plug into the bayonet slot of the bayonet slot USB connector socket, so that the locking cap and the socket clamp the flange; the mating USB connector plug and the bayonet slot USB connector socket are electrically connected, and at the same time they are mechanically fixed by threads or bayonet; the mobile phone connection holding mechanism is fixed with the matching USB connector plug, and also supports the mobile phone; the external thread or bayonet slot USB connector socket is inserted by a traditional mating USB connector plug without flange and internal thread locking cap, nor flange and bayonet locking cap, thereby: the external thread or bayonet slot of the socket is not used for matching with the traditional plug; the socket and the traditional plug are electrically connected without mechanical threads or bayonet locking; the mating USB connector plug with flange and internal thread locking cap, or flange and bayonet locking cap, inserts into a traditional USB connector socket without external threads nor bayonet slot, thereby: the flange end face of the mating USB connector plug touches or does not touch the inlet end face of the traditional socket; the internal thread locking cap or bayonet locking cap of the mating USB connector plug is not used for matching with the traditional socket; the mating USB connector plug and the traditional socket are electrically connected without mechanical threads or bayonet locking; or, the set of characteristics alternatively comprise: the mating USB connector plug with flange and screw through-hole plate and screws, or screw through-hole flange and screws inserts into the screw hole USB connector socket, thereby: the end face of the flange or the screw through-hole flange of the mating USB connector plug contacts the inlet end face of the bayonet slot USB connector socket; the screws of the plug go through the through-holes of the screw through-hole plate or the screw through-hole flange, and screw into the screw holes of the socket, so that the screw through-hole plate and the socket clamp the flange, or the screws and the bayonet slot USB connector socket clamp the screw through-hole flange; the mating USB connector plug and of the bayonet slot USB connector socket are electrically connected, and at the same time they are mechanically fixed by screws; the mobile phone connection holding mechanism is fixed with the matching USB connector plug, and also supports the mobile phone; the screw hole USB connector socket is inserted by the traditional mating USB connector plug without flange and screw through-hole plate and screws, nor screw through-hole flange and screws, thereby: the screw holes of the socket are not used for matching with traditional plugs; the bayonet slot USB connector socket and the traditional plug are electrically connected without mechanical screw locking; the mating USB connector plug with flanges and screw through-hole plate and screws, or screw through-hole flange and screws, inserts into the traditional USB connector socket without screw holes, thereby: the end face of the flange or the screw through-hole flange of the mating USB connector plug contacts or does not contact the inlet end face of the bayonet slot USB connector socket; the screws of the mating USB connector plug are not used for matching with the traditional socket; the mating USB connector plug and the traditional socket are electrically connected without mechanical screw locking; the USB connector sockets with external thread and bayonet slot, external thread and screw holes, external bayonet slot and screw holes, or external thread and external bayonet slot and screw holes are accept the mating USB connector plug with flange and internal thread locking cap, flange and bayonet locking cap, flange and screw through-hole plate and screws, or screw through-hole flange and screws at different times; according to the above operation, the mating USB connector plug and the bayonet slot USB connector socket are electrically connected with mechanically fixing for same locking mating type or without mechanically fixing for different locking mating type.

10. The vehicle of claim 9,
wherein the type of the USB connector is Type-A or Type-C, or is replaced with the HDMI connector; the sunken or raised socket has a perforated socket cover.

11. The vehicle of claim 9,
wherein the mobile phone is set on the mobile phone holder, and is operated directly on the phone; the sound is produced by the phone speaker, or the image is shown on the phone display; or the mobile phone gets the wired power or signal connection with other parts of the car infotainment system or with the car's connection converter through the mobile phone connector socket, or gets the wireless signal connection through Wi-Fi, Bluetooth or NFC wireless communication, such that:
use voice input, touch or key input on the mobile phone, to operate mobile application Apps, perform satellite navigation, play sound, play video, listen to the radio, watch TV, browse internet, make phone calls, or do text and video communications; the sound is produced by the car speakers, or the image is shown on the display of the car infotainment system;
use voice input, touch or key input on the car infotainment system, to operate mobile application Apps, perform satellite navigation, play sound, play video, listen to the radio, watch TV, browse internet, make phone calls, or do text and video communications; the sound is produced by the car speakers, or the image is shown on the display of the car infotainment system;
operate on the mobile phone or operate on the car infotainment system, to use the internal antenna of the mobile phone, or use the car's antenna for mobile phone communication, mobile data communication, Wi-Fi communication, Bluetooth communication, walkie-talkie phone communication, satellite navigation signal receiving, radio signal receiving, or TV signal receiving.

12. The vehicle of claim 9,
wherein there is a rubber ring between the port of the USB connector socket and the flange or port of the matching USB connector plug, so that high-performance sealing or waterproof performance can be achieved by squeezing the rubber ring.

13. The vehicle of claim 9,
wherein the USB connector socket of the car mobile phone connection device is installed on one or more of the front panel of the car dashboard, the upper panel of the car dashboard, the back of the car seat, the front ceiling of the car, the middle ceiling of the car, the rear ceiling of the car, the inside of the car window, the outside of the car roof, the outside of the car head, the exterior of the rear of the car, the exterior of both sides of the car, or on motorcycles, trains, ships, airplanes, buildings, instruments and equipment.

14. The vehicle of claim 9,
wherein the mobile phone holder is configured to hold a GPS satellite navigator, notebook computer, tablet computer, TV, display, camera, radar, lighting display board, searchlight, toy, lighting, fragrance, detector, electrical socket, electrical plug, socket extension converter, USB memory, USB audio player, USB video player, USB socket, USB interface extension converter, HDMI socket, electric heating cup, electric fan, wireless charger, wireless NFC communicator, coat hook, or its electrical connection device holder, so that it gets fixed mechanically or/and gets connected electrically.

15. A car mobile phone connection device comprising: a car cigarette lighter socket, or a mobile phone holder composed of a matching car cigarette lighter plug and a mobile phone connection holding mechanism, or a car containing a car cigarette lighter socket; wherein, the car cigarette lighter socket, in addition to car cigarette lighter jack electrodes, also has sunken external thread, sunken bayonet slot, raised bayonet slot, screw holes, sunken external thread and bayonet slot, raised external thread and bayonet slot, sunken external thread and screw holes, raised external thread and screw holes, sunken external bayonet slot and screw holes, raised external bayonet slot and screw holes, sunken external thread and bayonet slot plus screw holes, or raised external threads and bayonet slots plus screw holes; the matching car cigarette lighter plug of the mobile phone holder, in addition to the matching car cigarette lighter plug electrodes, also has flange and internal thread locking cap, flange and bayonet locking cap, flange and screw through-hole plate and screws, or screw through-hole flange and screws; the mobile phone connection holding mechanism of the mobile phone holder has one or more of the mobile phone connector plug, wireless charging board, NFC communication board, which are connected to the mating car cigarette lighter plug through internal or external circuits; wherein the car cigarette lighter socket is installed on the car, and the mobile phone is installed on the mobile phone connection holding mechanism; the mobile phone socket is sleeved on the mobile phone connector plug of the mobile phone connection holding mechanism for wired connection, in order to perform fixed voltage or current power supply, variable voltage or current power supply, or smart fast and slow charging according to the power supply protocol; or the mobile phone is closed to the wireless charging board of the mobile phone connection holding mechanism for wireless power connection; the mobile phone is powered or intelligently fast and slow charged by fixed or adjustable wireless transmission power according to corresponding wireless power supply protocol; the external thread, or bayonet slot car cigarette lighter socket, and matching mobile phone holder further have a set of characteristics including: a mating car cigarette lighter plug with flange and internal thread locking cap, or flange and bayonet locking cap, inserts into the external thread or bayonet slot car cigarette lighter socket, thereby: the flange end face of the plug contacts the inlet end face of the socket; screw the internal thread of the locking cap of the mating car cigarette lighter plug into the external thread of the bayonet slot car cigarette lighter socket, or insert and screw the bayonet claw of the locking cap of the plug into the bayonet slot of the bayonet slot car cigarette lighter socket, so that the locking cap and the socket clamp the flange; the mating car cigarette lighter plug and the bayonet slot car cigarette lighter socket are electrically connected, and at the same time they are mechanically fixed by threads or bayonet; the mobile phone connection holding mechanism is fixed with the matching car cigarette lighter plug, and also supports the mobile phone; the external thread or bayonet slot car cigarette lighter socket is inserted by a traditional mating car cigarette lighter plug without flange and internal thread locking cap, nor flange and bayonet locking cap, thereby: the external thread or bayonet slot of the bayonet slot car cigarette lighter socket is not used for matching with the traditional plug; the bayonet slot car cigarette lighter socket and the traditional plug are electrically connected without mechanical threads or bayonet locking; the mating car cigarette lighter plug with flange and internal thread locking cap, or flange and bayonet locking cap, inserts into a traditional car cigarette lighter socket without external threads nor bayonet slot, thereby: the flange end face of the plug touches or does not touch the inlet end face of the traditional socket; the internal thread locking cap or bayonet locking cap of the mating car cigarette lighter plug is not used for matching with the traditional socket; the mating car cigarette lighter plug and the traditional socket are electrically connected without mechanical threads or bayonet locking; or, the set of characteristics alternatively comprise: the mating car cigarette lighter plug with flange and screw through-hole plate and screws, or screw through-hole flange and screws inserts into the screw hole car cigarette lighter socket, thereby: the end face of the flange or the screw through-hole flange of the plug contacts the inlet end face of the socket; the screws of the plug go through the through-holes of the screw through-hole plate or the screw through-hole flange, and screw into the screw holes of the socket, so that the screw through-hole plate and the socket clamp the flange, or the screws and the socket clamp the screw through-hole flange; the mating car cigarette lighter plug and the bayonet slot car cigarette lighter socket are electrically connected, and at the same time they are mechanically fixed by screws; the mobile phone connection holding mechanism is fixed with the matching car cigarette lighter plug, and also supports the mobile phone; the screw hole car cigarette lighter socket is inserted by the traditional mating car cigarette lighter plug without flange and screw through-hole plate and screws, nor screw through-hole flange and screws, thereby: the screw holes of the socket are not used for matching with traditional plugs; the bayonet slot car cigarette lighter socket and the traditional plug are electrically connected without mechanical screw locking; the mating car cigarette lighter plug with flanges and screw through-hole plate and screws, or screw through-hole flange and screws, inserts into the traditional car cigarette lighter socket without screw holes, thereby: the end face of the flange or the screw through-hole flange of the plug contacts or does not contact the inlet end face of the socket; the screws of the mating car cigarette lighter plug are not used for matching with the traditional socket; the mating car cigarette lighter plug and the traditional socket are electrically connected without mechanical screw locking; wherein: the car cigarette lighter sockets with external thread and bayonet slot, external thread and screw holes, external bayonet slot and screw holes, or external thread and external bayonet slot and screw holes, can accept the mating car cigarette lighter plug with flange and internal thread locking cap, flange and bayonet locking cap, flange and screw through-hole plate and screws, or screw through-hole flange and screws at different times; according to the above operation, the mating car cigarette lighter plug and the bayonet slot car cigarette lighter socket are electrically connected with mechanically fixing for same locking mating type or without mechanically fixing for different locking mating type.

16. The car mobile phone connection device of claim 15, wherein the sunken or raised socket has a perforated socket cover.

17. The car mobile phone connection device of claim 15, wherein the mobile phone is set on the car cigarette lighter plug mobile phone holder, and is operated directly on the phone; the sound is produced by the phone speaker, or the image is shown on the phone display; or the mobile phone gets the wired power or signal connection with other parts of the car infotainment system or with the car's connection converter through the mobile phone connector socket, or gets the wireless signal connection through Wi-Fi or Bluetooth wireless communication, such that:

use voice input, touch or key input on the mobile phone, to operate mobile application Apps, perform satellite navigation, play sound, play video, listen to the radio, watch TV, browse internet, make phone calls, or do text and video communications; the sound is produced by the car speakers, or the image is shown on the display of the car infotainment system;

use voice input, touch or key input on the car infotainment system, to operate mobile application Apps, perform satellite navigation, play sound, play video, listen to the radio, watch TV, browse internet, make phone calls, or do text and video communications; the sound is produced by the car speakers, or the image is shown on the display of the car infotainment system;

operate on the mobile phone or operate on the car infotainment system, to use the internal antenna of the mobile phone, or use the car's antenna for mobile phone communication, mobile data communication, Wi-Fi communication, Bluetooth communication, walkie-talkie phone communication, satellite navigation signal receiving, radio signal receiving, or TV signal receiving.

18. The car mobile phone connection device of claim 15, wherein there is a rubber ring between the port of the car cigarette lighter socket and the flange or port of the matching car cigarette lighter plug, so that high-performance sealing or waterproof performance can be achieved by squeezing the rubber ring.

19. The car mobile phone connection device of claim 15, wherein the car cigarette lighter socket are installed on one or more of the front panel of the car dashboard, the upper panel of the car dashboard, the back of the car seat, the front ceiling of the car, the middle ceiling of the car, the rear ceiling of the car, the inside of the car window, the outside of the car roof, the outside of the car head, the exterior of the rear of the car, the exterior of both sides of the car, or on motorcycles, trains, ships, airplanes, buildings, instruments and equipment.

20. The car mobile phone connection device of claim 15, wherein, the mobile phone holder, is replaced with GPS satellite navigator, notebook computer, tablet computer, TV, monitor, camera, radar, lighting display board, searchlight, toy, lighting lamp, fragrance, detector, electrical socket, electrical plug, socket extension converter, Car cigarette lighter socket expansion converter, USB socket, USB interface expansion converter, HDMI socket, electric heating cup, electric fan, wireless charger, coat hook, or its electrical connection device holder, so that it gets fixed mechanically or/and gets connected electrically.

\* \* \* \* \*